United States Patent
Shen et al.

(10) Patent No.: US 11,907,819 B2
(45) Date of Patent: Feb. 20, 2024

(54) SYSTEMS AND METHODS TO GENERATE HIGH RESOLUTION FLOOD MAPS IN NEAR REAL TIME

(71) Applicant: University of Connecticut, Farmington, CT (US)

(72) Inventors: Xinyi Shen, Mansfield, CT (US); Emmanouil Anagnostou, Mansfield Center, CT (US); Qing Yang, Storrs, CT (US)

(73) Assignee: University of Connecticut, Farmington, CT (US)

( * ) Notice: Subject to any disclaimer, the term of this patent is extended or adjusted under 35 U.S.C. 154(b) by 323 days.

(21) Appl. No.: 16/953,995

(22) Filed: Nov. 20, 2020

(65) Prior Publication Data
US 2021/0149929 A1    May 20, 2021

Related U.S. Application Data

(60) Provisional application No. 62/938,017, filed on Nov. 20, 2019.

(51) Int. Cl.
| | |
|---|---|
| G06K 9/00 | (2022.01) |
| G06N 20/10 | (2019.01) |
| G06F 16/29 | (2019.01) |
| G06F 16/535 | (2019.01) |
| G06N 20/00 | (2019.01) |
| G06T 7/514 | (2017.01) |
| G06V 20/10 | (2022.01) |
| G06F 18/21 | (2023.01) |

(52) U.S. Cl.
CPC ............. *G06N 20/10* (2019.01); *G06F 16/29* (2019.01); *G06F 16/535* (2019.01); *G06N 20/00* (2019.01); *G06T 7/514* (2017.01); *G06V 20/182* (2022.01); *G06F 18/2193* (2023.01); *G06T 2207/10032* (2013.01); *G06T 2207/20081* (2013.01); *G06T 2207/30192* (2013.01)

(58) Field of Classification Search
None
See application file for complete search history.

(56) References Cited

U.S. PATENT DOCUMENTS

2018/0197305 A1    7/2018   Hostache et al.

OTHER PUBLICATIONS

Shen, Xinyi, et al. "Near-real-time non-obstructed flood inundation mapping using synthetic aperture radar." Remote Sensing of Environment 221 (2019): 302-315. (Year: 2019).*

(Continued)

*Primary Examiner* — Avinash Yentrapati
(74) *Attorney, Agent, or Firm* — Michael Best & Friedrich LLP

(57) ABSTRACT

A system and method to generate flood inundation maps in near real time. The system includes a plurality of computer processing modules: a flood trigger system, a SAR data query system, and a RAPID kernel algorithm system, running in real time, to identify the potential flood zones, query SAR data, and finally compute the inundation maps, respectively. As disclosed herein, the RAPID kernel algorithm is extended to a fully automated flood mapping system that requires no human interference from the initial flood events discovery to the final flood map production.

18 Claims, 19 Drawing Sheets
(16 of 19 Drawing Sheet(s) Filed in Color)

(56) References Cited

OTHER PUBLICATIONS

Van Ackere, Samuel, et al. "A review of the internet of floods: Near real-time detection of a flood event and its impact." Water 11.11 (2019): 2275. (Year: 2019).*

Acuña, V. et al. Why should we care about temporary waterways? Science 343, 1080-1081 (2014).

Adhikari, P., Hong, Y., Douglas, K. R., Kirschbaum, D. B., Gourley, J., Adler, R., and Robert Brakenridge, G. 2010: A digitized global flood inventory (1998-2008): Compilation and preliminary results, Nat. Hazards, 55, 405-422. doi:10.1007/s11069-010- 9537-2.

Afshari, S., Tavakoly, A. A., Rajib, M. A., Zheng, X., Folium, M. L., Omranian, E., Fekete and B. M., 2018: Comparison of new generation low-complexity flood inundation mapping tools with a hydrodynamic model, J. Hydrol, 556, 539-556, doi:10.1016/j.jhydrol.2017.11.036.

Aires, F., Miolane, L., Prigent, C., Pham, B., Chouinard, E. F., Lehner, B., Papa, F., 2017: A Global Dynamic Long-Term Inundation Extent Dataset at High Spatial Resolution Derived through Downscaling of Satellite Observations, J. Hydrometeorol., 18, 1305-1325, doi: 10.1175/JHM-D-16-0155.1.

Aires, F., Prigent, C., Chouinard, E. F., Yamazaki, D., Papa, F., Lehner B., 2018: Comparison of visible and multi-satellite global inundation datasets at high-spatial resolution. Remote Sens. Environ., 216, 427-441, doi:10.1016/j.rse.2018.06.015.

Aires, F.; Papa, F.; Prigent, C.; Cretaux, J.-F.; Berge-Nguyen, M. Characterization and space-time downscaling of the inundation extent over the inner niger delta using giems and modis data. J. Hydrometeorol. 2014, 15, 171-192.

Allen, G.H., & Pavelsky, T.M. (2018). Global extent of rivers and streams. Science, 361, 585-588.

Almukhtar, S., Migliozzi, B., Schwartz, J., Williams, J., 2019: The Great Flood of 2019: A Complete Picture of a Slow-Motion Disaster, accessed Sep. 11, 2019, https://www.nytimes.com/interactive/2019/09/11/us/midwest-flooding.html.

Arendt, A. et al. Randolph Glacier Inventory—A Dataset of Global Glacier Outlines: Version 5.0 http://www.glims.org/RGI/ (Global Land Ice Measurements from Space, Digital Media, 2015).

Arst, H. Optical Properties and Remote Sensing of Multicomponental Water Bodies vol. XII of Marine Science and Coastal Management Ch. 1 (Springer Science Praxis, 2003).

Arvidson, T., Gasch, J. & Goward, S. N. Landsat 7's long-term acquisition plan—an innovative approach to building a global imagery archive. Remote Sens. Environ. 78, 13-26 (2001).

Bates, P., Horritt, M., Smith, C., & Mason, D. (1997). Integrating remote sensing observations of flood hydrology and hydraulic modelling. Hydrological Processes, 11, 1777-1795.

Bazi, Y., Bruzzone, L., & Melgani, F. (2005). An unsupervised approach based on the generalized Gaussian model to automatic change detection in multitemporal SAR images. IEEE Transactions on Geoscience and Remote Sensing, 43, 874-887.

Belward, A. S. & Skøien, J. O. Who launched what, when and why; trends in Global Land-Cover Observation capacity from civilian Earth Observation satellites. ISPRS J. Photogramm. Remote Sens. 103, 115-128 (2015).

Blake, E. S. and Zelinsky, D. A., 2018: NHC Tropical Cyclone Report—Hurricane Harvey (AL092017), 77pp, https://www.nhc.noaa.gov/data/tcr/AL092017_Harvey.pdf.

Bolanos, S., Stiff, D., Brisco, B., Pietroniro, A., 2016: Operational surface water detection and monitoring using Radarsat 2. Remote Sens., 8, doi:10.3390/rs8040285.

Bonetto, A. A., Wais, J. R. & Castello, H. P. The increasing damming of the Paraná basin and its effects on the lower reaches. Regul. Rivers Res. Manage. 4, 333-346 (1989).

Borghys, D., Yvinec, Y., Perneel, C., Pizurica, A., & Philips, W. (2006). Supervised feature—based classification of multi-channel SAR images. Pattern Recognition Letters, 27, 252-258.

Bovolo, F.; Bruzzone, L. A split-based approach to unsupervised change detection in large-size multitemporal images: Application to tsunami-damage assessment. IEEE Trans. Geosci. Remote Sens. 2007, 45, 1658-1670.

Bracaglia, M., Ferrazzoli, P., & Guerriero, L. (1995). A fully polarimetric multiple scattering model for crops. Remote Sensing of Environment, 54, 170-179.

Brakenridge, Dartmouth Flood Observatory, University of Colorado, 2010: Global Active Archive of Large Flood Events, accessed Sep. 20, 2020, http://floodobservatory.colorado.edu/Archives/index.html.

Cerrai, D., Yang, Q., Shen, X., Koukoula, M., and Anagnostou, E. N., 2020: Brief communication: Hurricane Dorian: Automated near-real-time mapping of the "unprecedented" flooding in the Bahamas using synthetic aperture radar. Nat. Hazards Earth Syst. Sci., 20(5), 1463-1468, doi: 10.5194/nhess-20-1463-2020.

Chen, J. et al. A simple and effective method for filling gaps in Landsat ETM+ SLC-off images. Remote Sens. Environ. 115, 1053-1064 (2011).

Chini, M.; Hostache, R.; Giustarini, L.; Matgen, P. A hierarchical split-based approach for parametric thresholding of sar images: Flood inundation as a test case. IEEE Trans. Geosci. Remote Sens. 2017, 55. 6975-6988.

Chini, M.; Papastergios, A.; Pulvirenti, L.; Pierdicca, N.; Matgen, P.; Parcharidis, I. Sar coherence and polarimetric information for improving flood mapping. In Proceedings of the 2016 IEEE International Geoscience and Remote Sensing Symposium (IGARSS), Beijing, China, Jul. 10, 15, 2016; pp. 7577-7580.

Chini, M.; Pelich, R.; Hostache, R.; Matgen, P.; Lopez-Martinez, C. Towards a 20 m global building map from sentinel-1 sar data. Remote Sens. 2018, 10, 1833.

Chini, M.; Pelich, R.; Pulvirenti, L.; Pierdicca, N.; Hostache, R.; Matgen, P. Sentinel-1 insar coherence to detect floodwater in urban areas: Houston and hurricane harvey as a test case. Remote Sens. 2019, 11, 107.

Chouinard, E. F., Lehner B., Rebelo, L. M., Papa, F., Hamilton and S. K., 2015: Development of a global inundation map at high spatial resolution from topographic downscaling of coarse-scale remote sensing data. Remote Sens. Environ., 158, 348-361, doi:10.1016/j.rse.2014.10.015.

Cian, F.; Marconcini, M.; Ceccato, P. Normalized difference flood index for rapid flood mapping: Taking advantage of eo big data. Remote Sens. Environ. 2018, 209, 712-730.

Cian, F.; Marconcini, M.; Ceccato, P.; Giupponi, C.J.N.H.; Sciences, E.S. Flood depth estimation by means of high-resolution sarimages and lidar data. Nat. Hazards Earth Syst. Sci. 2018, 18, 3063-3084.

Cohen, M. J., Creed, I. F., Alexander, L., Basu, N. B., Calhoun, A. J. K., Craft, C., D'Amico, E., DeKeyser, E., Fowler, L., Golden, H. E., Jawitz, J. W., Kalla, P., Kirkman, L. K., Lane, C. R., Lang, M., Leibowitz, S. G., Lewis, D. B., Marton, J., McLaughlin, D. L., Walls, S. C. (2016). Do geographically isolated wetlands influence landscape functions? Proc. Natl. Acad. Sci. U. S. A., 113(8), 1978-1986, doi:org/10.1073/pnas.1512650113.

Cohen, S.; Brakenridge, G.R.; Kettner, A.; Bates, B.; Nelson, J.; McDonald, R.; Huang, Y.F.; Munasinghe, D.; Zhang, J. Estimating floodwater depths from flood inundation maps and topography. JAWRA J. Am. Water Resour. Assoc. 2017, 54, 847-858.

Cohen, W. B. & Goward, S. N. Landsat's role in ecological applications of remote sensing. Bioscience 54, 535-545 (2004).

Covello, F., Battazza, F., Coletta, A., Lopinto, E., Fiorentino, C., Pietranera, L., Valentini, G. and Zoffoli, S.: COSMO-SkyMed an existing opportunity for observing the Earth. Journal of Geodynamics, 49(3-4), 171-180, 2010.

Danielson, J. J. & Gesch, D. B. Global Multi-Resolution Terrain Elevation Data 2010 (GMTED2010). USGS Report 2011-1073, https://pubs.er.usgs.gov/publication/ofr20111073 (USGS Publications Warehouse, 2011).

Delaunay, B. Sur la sphere vide. Bull. Acad. Sci. USSR 7, 793-800, http://www.mathnet.ru/links/bf140e013bb2829a727614ee4e41051a/im4937.pdf (1934).

DeVries, B., Huang, C., Lang, M. W., Jones, J. W., Huang, W., Creed, I. F., and Carroll, M. L., 2017: Automated quantification of

(56) References Cited

OTHER PUBLICATIONS surface water inundation in wetlands using optical satellite imagery. Remote Sens., 9, doi:10.3390/rs9080807.

Directorate Space, Security and Migration, European Commission Joint Research Centre (EC JRC), 2015: Copernicus Emergency Management Service, accessed Aug. 21, 2020. https://emergency.copernicus.eu/.

Dodov, B.; Foufoula-Georgiou, E. Floodplain morphometry extraction from a high-resolution digital elevation model: A simple algorithm for regional analysis studies. Geosci. Remote Sens. Lett. IEEE 2006, 3, 410-413.

Downing, J. A. et al. The global abundance and size distribution of lakes, ponds, and impoundments. Limnol. Oceanogr. 51, 2388-2397 (2006).

Du, J., Kimball, J. S., Galantowicz, J., Kim, S. B., Chan, S. K., Reichle, R., Jones, L. A., and Watts, J. D., 2018: Assessing global surface water inundation dynamics using combined satellite information from SMAP, AMSR2 and Landsat, Remote Sens. Environ., 213, 1-17, doi:10.1016/j.rse.2018.04.054.

Du, J., Kimball, J.S., Jones, L.A., Kim, Y., Glassy, J. and Watts, J.D., 2017: A global satellite environmental data record derived from AMSR-E and AMSR2 microwave earth observations. Earth Syst. Sci. Data, 9 (2), 791. doi:10.5194/essd-9-791-2017.

Federal Emergency Management Agency, 2016: FEMA Policy Standards for Flood Risk Analysis and Mapping, 79pp, https://www.fema.gov/media-library-data/1581015527397-57f85306e2a67abc6a852298a9bcae77/Standards_for_Flood_Risk_Projects_(Nov.2016).pdf.

Federal Emergency Management Agency, 2019: NFIP Redacted Claims Data Set, accessed Apr. 20, 2020, https://www.fema.gov/media-library/assets/documents/180374.

Feng, M., Sexton, J. O., Channan, S. & Townshend, J. R. A global, high-resolution (30-m) inland water body dataset for 2000: first results of a topographic-spectral classification algorithm. Int. J. Digit. Earth 9, 113-133 (2015).

Ferro, A., Brunner, D., Bruzzone, L., & Lemoine, G. (2011). On the relationship between double bounce and the orientation of buildings in VHR SAR images. IEEE Geoscience and Remote Sensing Letters, 8, 612-616.

Feyisa, G.L., Meilby, H., Fensholt, R., and Proud, S.R., 2014: Automated Water Extraction Index: A new technique for surface water mapping using Landsat imagery. Remote Sens. Environ. 140, 23-35, doi:org/10.1016/j.rse.2013.08.029.

Frasson, R. P. d. M., Pavelsky, T. M., Fonstad, M. A., Durand, M. T., Allen, G. H., Schumann, G., Lion, C., Beighley, R. E., & Yang, X., 2019b: Global Relationships Between River Width, Slope, Catchment Area, Meander Wavelength, Sinuosity, and Discharge. Geophys. Res. Lett., 46(6), 3252-3262, doi:10.1029/2019GL082027.

Frasson, R. P. de M., Schumann, G. J. P., Kettner, A. J., Brakenridge, G. R., and Krajewski, W. F., 2019a: Will the Surface Water and Ocean Topography (SWOT) Satellite Mission Observe Floods? Geophys. Res. Lett., 46(17-18), 10435-10445, doi:org/10.1029/2019GL084686.

Freeman, A.; Durden, S.L. A three-component scattering model for polarimetric sar data. IEEE Trans. Geosci. Remote Sens. 1998, 36, 963-973.

Fry, J.A., Xian, G., Jin, S., Dewitz, J.A., Homer, C.G., Limin, Y., Barnes, C.A., Herold, N.D., & Wickham, J.D. (2011). Completion of the 2006 national land cover database for the conterminous United States. Photogrammetric engineering and remote sensing, 77, 858-864.

Fung, A.K., Shah, M.R., & Tjuatja, S. (1994). Numerical simulation of scattering from three-dimensional randomly rough surfaces. Geoscience and Remote Sensing, IEEE Transactions on, 32, 986-994.

Gardner, R. C. et al. State of the World's Wetlands and Their Services to People: A Compilation of Recent Analyses. Ramsar Briefing Note No. 7, http://dx.doi.org/10.2139/ssrn.2589447 (Ramsar Convention Secretariat, SSRN, 2015).

Giustarini, L., Hostache, R., Matgen, P., Schumann, G.J.-P., Bates, P.D., & Mason, D.C. (2013). A change detection approach to flood mapping in urban areas using TerraSAR-X. Geoscience and Remote Sensing, IEEE Transactions on, 51, 2417-2430.

Giustarini, L.; Hostache, R.; Kavetski, D.; Chini, M.; Corato, G.; Schlaffer, S.; Matgen, P. Probabilistic flood mapping using synthetic aperture radar data. IEEE Trans. Geosci. Remote Sens. 2016, 54, 6958-6969.

Global 30-Arc Second Elevation Data Set (GTOPO30) https://lta.cr.usgs.gov/GTOPO30 (Department of the Interior, USGS, 1996).

Global Administrative Areas (GADM) version 2.6, https://uwaterloo.ca/library/geospatial/collections/us-and-world-geospatial-data-resources/globaladministrative-areas-gadm (Univ. Berkeley, Museum of Vertebrate Zoology and the International Rice Research Institute, 2012).

Gomez, L.; Ospina, R.; Frery, A.C. Statistical properties of an unassisted image quality index for sar imagery. Remote Sens. 2019, 11, 385.

Gong, P., Wang, J., Yu, L., Zhao, Y., Zhao, Y., Liang, L., Niu, Z., Huang, X., Fu, H., & Liu, S. (2013). Finer resolution observation and monitoring of global land cover: first mapping results with Landsat TM and ETM+ data. International Journal of Remote Sensing, 34, 2607-2654.

Gourley, J. J., and Coauthors, 2013: A unified flash flood database across the United States. Bull. Amer. Meteor. Soc., 94, 799-805, doi:10.1175/BAMS-D-12-00198.1.

Goward, S. et al. Historical record of Landsat global coverage. Photogramm. Eng. Remote Sensing 72, 1155-1169 (2006).

Gray, A.L.; Vachon, P.W.; Livingstone, C.E.; Lukowski, T.I. Synthetic aperture radar calibration using reference reflectors. IEEE Trans. Geosci. Remote Sens. 1990, 28, 374-383.

Gutman, G. et al. Assessment of the NASA—USGS global land survey (GLS) datasets. Remote Sens. Environ. 134, 249-265 (2013).

Hagedorn, M., Smith, P., Bones, P., Millane, R., & Pairman, D. (2006). A trivariate chi-squared distribution derived from the complex Wishart distribution. Journal of Multivariate analysis, 97, 655-674.

Hardesty, S.; Shen, X.; Nikolopoulos, E.; Anagnostou, E. A numerical framework for evaluating flood inundation risk under different dam operation scenarios. Water 2018, 10, 1798.

Heimhuber, V.; Tulbure, M.G.; Broich, M. Modeling multidecadal surface water inundation dynamics and key drivers on large river basin scale using multiple time series of earth—observation and river flow data. Water Resour. Res. 2017, 53, 1251-1269.

Heremans, R., Willekens, A., Borghys, D., Verbeeck, B., Valckenborgh, J., Acheroy, M., & Perneel, C. (2003). Automatic detection of flooded areas on ENVISAT/ASAR images using an object-oriented classification technique and an active contour algorithm. In, Recent Advances in Space Technologies, 2003. RAST'03. International Conference on. Proceedings of (pp. 311-316): IEEE.

Hirose, K., Maruyama, Y., Do Van, Q., Tsukada, M., & Shiokawa, Y. (2001). Visualization of flood monitoring in the lower reaches of the Mekong River. In, Paper presented at the 22nd Asian Conference on Remote Sensing (p. 9).

Holgerson, M. A. & Raymond, P. A. Large contribution to inland water $CO_2$ and $CH_4$ emissions from very small ponds. Nat. Geosci. 9, 222-226 (2016).

Homer, C., Dewitz, J., Fry, J., Coan, M., Hossain, N., Larson, C., Herold, N., McKerrow, A., VanDriel, J.N., & Wickham, J. (2007). Completion of the 2001 national land cover database for the counterminous United States. Photogrammetric Engineering and remote sensing, 73, 337.

Homer, C., Dewitz, J., Yang, L., Jin, S., Danielson, P., Xian, G., Coulston, J., Herold, N., Wickham, J., & Megown, K. (2015). Completion of the 2011 National Land Cover Database for the conterminous United States—representing a decade of land cover change information. Photogrammetric Engineering & Remote Sensing, 81, 345-354.

Horritt, M. (1999). A statistical active contour model for SAR image segmentation. Image and Vision Computing, 17, 213-224.

Horritt, M.; Bates, P. Evaluation of 1d and 2d numerical models for predicting river flood inundation. J. Hydrol. 2002, 268, 87-99.

(56) References Cited

OTHER PUBLICATIONS

Horritt, M.S., Mason, D.C., & Luckman, A.J. (2001). Flood boundary delineation from synthetic aperture radar imagery using a statistical active contour model. International Journal of Remote Sensing, 22, 2489-2507.

Horritt, M.S., Mason, D.C., Cobby, D.M., Davenport, I.J., & Bates, P.D. (2003). Waterline mapping in flooded vegetation from airborne SAR imagery. Remote Sensing of Environment, 271-281.

Huang, C., Peng, Y., Lang, M., Yeo, I.Y., McCarty, G., 2014: Wetland inundation mapping and change monitoring using Landsat and airborne LiDAR data. Remote Sens. Environ. 141, 231-242. doi:10.1016/j.rse.2013.10.020.

Huffman, G. J. et al. 2015: NASA global precipitation measurement (GPM) integrated multi-satellite retrievals for GPM (IMERG). Algorithm theoretical basis document, version 4, 30pp, https://gpm.nasa.gov/sites/default/files/document_files/IMERG_ATBD_V4.5.pdf.

J. C. Roberts, "State of the Art: Coordinated & Multiple Views in Exploratory Visualization," Fifth International Conference on Coordinated and Multiple Views in Exploratory Visualization (CMV 2007), Zurich, Switzerland, 2007, pp. 61-71.

Jarvis, A., Reuter, H. I., Nelson, A. & Guevara, E. Hole-filled SRTM forthe Globe Version 4 http://srtm.csi.cgiar.org (CGIAR-CSI SRTM 90m Database, 2008).

Jin, H., C. Huang, Lang, M. W., Yeo, I. Y., and Stehman, S. V., 2017: Monitoring of wetland inundation dynamics in the Delmarva Peninsula using Landsat time-series imagery from 1985 to 2011. Remote Sens. Environ., 190, 26-41, doi:10.1016/j.rse.2016.12.001.

Jin, S., Yang, L., Danielson, P., Homer, C., Fry, J., &Xian, G. (2013). A comprehensive change detection method for updating the National Land Cover Database to circa 2011. Remote Sensing of Environment, 132, 159-175.

Jones, J. The us geological survey dynamic surface water extent product evaluation strategy. In Proceedings of the EGU General Assembly Conference Abstracts, Vienna, Austria, Apr. 17-22, 2016; vol. 18, p. 8197.

Jones, J. W., 2015: Efficient wetland surface water detection and monitoring via Landsat: Comparison with in situ data from the everglades depth estimation network. Remote Sens, 7, 12503-12538, doi:10.3390/rs70912503.

Jones, J.W. Improved automated detection of subpixel-scale inundation—Revised dynamic surface water extent (dswe) partial surface water tests. Remote Sens. 2019, 11, 374.

Kartikeyan, B., Majumder, K. L. & Dasgupta, A. R. An expert system for land cover classification. IEEE Trans. Geosci. Remote Sens. 33, 58-66 (1995).

Kasischke, E., Smith, K., Bourgeau-Chavez, L., Romanowicz, E., Brunzell, S., & Richardson C. (2003). Effects of seasonal hydrologic patterns in south Florida wetlands on radar backscatter measured from ERS-2 SAR imagery, Remote Sensing of Environment, 88, 423-441.

Keim, D. A. et al. in Visual Data Mining 76-90, http://kops.uni-konstanz.de/bitstream/handle/123456789/5631/Visual_Analytics_Scope_and_Challenges.pdf?sequence= 1&isAllowed= y (Springer, 2008).

Kittier, J.; Illingworth, J. Minimum error thresholding. Pattern Recognit. 1986, 19, 41-47.

Klein, I. et al. Results of the Global WaterPack: a novel product to assess inland water body dynamics on a daily basis. Remote Sens. Lett. 6, 78-87 (2015).

Kosarev, A. N., Kostianoy, A. G. & Zonn, I. S. Kara-Bogaz-Gol Bay: physical and chemical evolution. Aquat. Geochem. 15, 223-236 (2009).

Kostinski, A., & Boerner, W. (1986). On foundations of radar polarimetry. IEEE Transactions on Antennas and Propagation, 34, 1395-1404.

Kousky, C., and Michel-Kerjan, E., 2017: Examining Flood Insurance Claims in the United States: Six Key Findings. J. Risk Insur., 84(3), 819-850, doi:org/10.1111/jori.12106.

Kussul, N., Shelestov, A., & Skakun, S. (2008). Grid system for flood extent extraction from satellite images. Earth Science Informatics, 1, 105.

Landuyt, L.; VanWesemael, A.; Schumann, G.J.; Hostache, R.; Verhoest, N.E.; Van Coillie, F.M. Flood mapping based on synthetic aperture radar: An assessment of established approaches. IEEE Trans. Geosci. Remote 2018, 57, 1-18.

Lang, M. W., Kasischke, E. S., Prince, S. D., and Pittman, K. W., 2008: Assessment of C-band synthetic aperture radar data for mapping and monitoring Coastal Plain forested wetlands in the Mid-Atlantic Region, U.S.A. Remote Sens. Environ., 112, 4120-4130, doi:10.1016/j.rse.2007.08.026.

Lee, J.S.; Pottier, E. Polarimetric Radar Imaging: From Basics to Applications; CRC: Boca Raton, FL, USA, 2009.

Lehner, B. & Döll, P. Development and validation of a global database of lakes, reservoirs and wetlands. J. Hydrol. 296, 1-22 (2004).

Lehner, B., Verdin, K., and Jarvis, A., 2013: HydroSHEDS Technical Documentation Version 1.2. In EOS Transactions, 26pp, https://hydrosheds.org/images/inpages/HydroSHEDS_TechDoc_v1_2.pdf.

Li, S., Sun, D., Goldberg, M. D., Sjoberg, B., Santek, D., Hoffman, J. P., Deweese, M., Restrepo, P., and Lindsey, S., 2018: Automatic near real-time flood detection using Suomi-NPP/VIIRS data, Remote Sens. Environ., 204, 672-689, doi:10.1016/j.rse.2017.09.032.

Lin, P., Pan, M., Allen, G. H., de Frasson, R. P., Zeng, Z., Yamazaki, D., and Wood, E. F., 2020: Global Estimates of Reach-Level Bankfull River Width Leveraging Big Data Geospatial Analysis. Geophys. Res. Lett., 47(7), doi:10.1029/2019GL086405.

Lin, P., Pan, M., Beck, H. E., Yang, Y., Yamazaki, D., Frasson, R. P. d. M., David, C. H., Durand, M. T., Pavelsky, T. M., Allen, G. H., Gleason, C. J., and Wood, E. F., 2019: Global Reconstruction of Naturalized River Flows at 2.94 Million Reaches. Water Resour. Res., 55(8), 6499-6516. doi:10.1029/2019WR025287.

Liu, B. et al. Outburst flooding of the moraine-dammed Zhuonai Lake on Tibetan plateau: causes and impacts. IEEE Geosci. Remote Sens. Lett. 13, 570-574 (2016).

Liu, Z.; Merwade, V.; Jafarzadegan, K. Investigating the role of model structure and surface roughness in generating flood inundation extents using one-and two-dimensional hydraulic models. J. Flood Risk Manag. 2018, 12, e12347.

Loveland, T. R. & Dwyer, J. L. Landsat: building a strong future. Remote Sens. Environ. 122, 22-29 (2012).

Lu, D. & Weng, Q. A survey of image classification methods and techniques for improving classification performance. Int. J. Remote Sens. 28, 823-870 (2007).

Lu, J., Giustarini, L., Xiong, B., Zhao, L., Jiang, Y., & Kuang, G. (2014). Automated flood detection with improved robustness and efficiency using multi-temporal SAR data. Remote Sensing Letters, 5, 240-248.

Lutz, A. F., Immerzeel, W. W., Shrestha, A. B. & Bierkens, M. F. P. Consistent increase in High Asia's runoff due to increasing glacier melt and precipitation. Nat. Clim. Chang. 4, 587-592 (2014).

MacDonald, G. M. Water, climate change, and sustainability in the southwest. Proc. Natl Acad. Sci. USA 107, 21256-21262 (2010).

Manavalan, R. (2017). SAR image analysis techniques for flood area mapping-literature survey. Earth Science Informatics, 10, 1-14.

Markham, B. L., Storey, J. C., Williams, D. L. & Irons, J. R. Landsat sensor performance: history and current status. IEEE Trans. Geosci. Remote Sens. 42, 2691-2694 (2004).

Martinis, S., & Rieke, C. (2015). Backscatter analysis using multi-temporal and multi-frequency SAR data in the context of flood mapping at River Saale, Germany. Remote Sensing, 7, 7732-7752.

Martinis, S.; Kersten, J.; Twele, A. A fully automated terrasar-x based flood service. Isprs J. Photogramm. Remote Sens. 2015, 104, 203-212.

Martinis, S.; Twele, A.; Voigt, S. Towards operational near real-time flood detection using a split-based automatic thresholding procedure on high resolution terrasar-x data. Nat. Hazards Earth Syst. Sci. 2009, 9, 303-314.

Mason, D. C., Trigg, M., Garcia-Pintado, J., Cloke, H. L., Neal, J. C., and Bates, P. D., 2016: Improving the TanDEM-X Digital Elevation Model for flood modelling using flood extents from

(56) References Cited

OTHER PUBLICATIONS

Synthetic Aperture Radar images. Remote Sens. Environ., 173, 15-28, doi:10.1016/j.rse.2015.11.018.

Mason, D.C., Davenport, I.J., Neal, J.C., Schumann, G.J.-P., & Bates, P.D. (2012). Near real-time flood detection in urban and rural areas using high-resolution synthetic aperture radar images. IEEE Transactions on Geoscience and Remote Sensing, 50, 3041-3052.

Mason, D.C.; Giustarini, L.; Garcia-Pintado, J.; Cloke, H.L. Detection of flooded urban areas in high resolution synthetic aperture radar images using double scattering. Int. J. Appl. Earth Obs. Geoinf. 2014, 28, 150-159.

Mason, D.C.; Speck, R.; Devereux, B.; Schumann, G.J.-P.; Neal, J.C.; Bates, P.D. Flood detection in urban areas using terrasar-x. IEEE Trans. Geosci. Remote Sens. 2010, 48, 882-894.

Matgen, P., El Idrissi, A., Henry, J.B., Tholey, N., Hoffmann, L., De Fraipont, P., & Pfister, L. (2006). Patterns of remotely sensed floodplain saturation and its use in runoff predictions. Hydrological processes, 20, 1805-1825.

Matgen, P., Henry, J., Pappenberger, F., Pfister, L., de Fraipont, P., & Hoffmann, L. (2004). Uncertainty in calibrating flood propagation models with flood boundaries derived from synthetic aperture radar imagery. Proc. 20th Congr. Int. Soc. Photogramm. Remote Sens., Istanbul, Turkey, 352-358.

Matgen, P.; Hostache, R.; Schumann, G.; Pfister, L.; Hoffmann, L.; Savenije, H. Towards an automated sar-based flood monitoring system: Lessons learned from two case studies. Phys. Chem. Earthparts A/B/C 2011, 36, 241-252.

Messager, M.L., Lehner, B., Grill, G., Nedeva, I., & Schmitt, O. (2016). Estimating the vol. and age of water stored in global lakes using a geo-statistical approach. Nature communications, 7, 13603.

Micklin, P. The future Aral Sea: hope and despair. Environ. Earth Sci. 75, 844 (2016).

Mladenova, I.E., Jackson, T.J., Bindlish, R., & Hensley, S. (2013). Incidence angle normalization of radar backscatter data. IEEE Transactions on Geoscience and Remote Sensing, 51, 1791-1804.

Mueller, N. et al. Water observations from space: mapping surface water from 25 years of Landsat imagery across Australia. Remote Sens. Environ. 174, 341-352 (2016).

Najafi, A. & Vatanfada, J. Environmental challenges in transboundary waters, case study: Hamoon Hirmand Wetland (Iran and Afghanistan). Int. J. Wat. Resour. Arid Environ. 1, 16-24 (2011).

Nardi, F.; Biscarini, C.; Di Francesco, S.; Manciola, P.; Ubertini, L. Comparing a large-scale dem-based floodplain delineation algorithm with standard flood maps: The fiber river basin case study. Irrig. Drain. 2013, 62, 11-19.

NASA, 2019: NASA-ISRO SAR (NISAR) Mission Science Users' Handbook, 139pp, https://nisar.jpl.nasa.gov/system/documents/files/26_NISAR_FINAL_9-6-19.pdf.

NASA, Jet Propulsion Laboratory (JPL), 2017: Advanced Rapid Imaging and Analysis Project, accessed Aug. 21, 2020, https://aria.jpl.nasa.gov/.

Nguyen, N.Y.; Ichikawa, Y.; Ishidaira, H. Estimation of inundation depth using flood extent information and hydrodynamic simulations. Hydrol. Res. Lett. 2016, 10, 39-44.

OFCM, 2019: Federal Meteorological Handbook No. 1: Surface Weather Observations and Reports, Washington, D.C., 101pp, https://www.ofcm.gov/publications/fmh/FMH1/fmh1_2019.pdf.

Ormsby, J.P.; Blanchard, B.J.; Blanchard, A.J. Detection of lowland flooding using active microwave systems. Photogramm. Eng. Remote Sens. 1985, 51, 317-328.

Papa, F.; Prigent, C.; Aires, F.; Jimenez, C.; Rossow, W.; Matthews, E. Interannual variability of surface water extent at the global scale, 1993-2004. J. Geophys. Res. Atmos. 2010, 115.

Pekel, J.-F et al. A near real-time water surface detection method based on HSV transformation of MODIS multi-spectral time series data. Remote Sens. Environ. 140, 704-716 (2014).

Pekel, J.-F., Cottam, A., Gorelick, N., & Belward, A.S. (2016). High-resolution mapping of global surface water and its long-term changes. Nature, 540, 418-422.

Pesaresi, M. et al. Operating Procedure forthe Production of the Global Human Settlement Layer from Landsat Data of the Epochs 1975, 1990, 2000, and 2014 http://publications.jrc.ec.europa.eu/repository/handle/JRC97705 (Publications Office of the European Union, 2016).

Pesaresi, M. et al. A global human settlement layer from optical HR/VHR RS data: concept and first results. IEEE J. Sel. Top. Appl. Earth Obs. Remote Sens. 6, 2102-2131 (2013).

Pethick, J. & Orford, J. D. Rapid rise in effective sea-level in southwest Bangladesh: its causes and contemporary rates. Glob. Planet. Change 111, 237-245 (2013).

Postel, S. L., Daily, G. C. & Ehrlich, P. R. Human appropriation of renewable fresh water. Science 271, 785-788 (1996).

Prigent, C. et al. Changes in land surface water dynamics since the 1990s and relation to population pressure. Geophys. Res. Lett. 39, L08403 (2012).

Prigent, C., Lettenmaier, D. P., Aires, F., and Papa, F., 2016: Toward a high resolution monitoring of continental surface water extent and dynamics, at global scale: From GIEMS (Global Inundation Extent from Multi-Satellites) to SWOT(Surface Water Ocean Topography). Surv. Geophys., 37, 399-355, doi:10.1007/s10712-015-9339-x.

Prigent, C., Papa, F., Aires, F., Rossow, W.B. and Matthews, E., 2007: Global inundation dynamics inferred from multiple satellite observations, 1993-2000. J. Geophys. Res., 112, D12107, doi:10.1029/2006JD007847.

Pulvirenti, L., Chini, M., Pierdicca, N., Guerriero, L., & Ferrazzoli, P. (2011a). Flood monitoring using multi-temporal COSMO-SkyMed data: Image segmentation and signature interpretation. Remote Sensing of Environment, 115, 990-1002.

Pulvirenti, L., Pierdicca, N., & Chini, M. (2010). Analysis of Cosmo-SkyMed observations of the 2008 flood in Myanmar. Italian Journal of Remote Sensing, 42, 79-90.

Pulvirenti, L., Pierdicca, N., Chini, M., & Guerriero, L. (2013). Monitoring flood evolution in vegetated areas using COSMO-SkyMed data: The Tuscany 2009 case study. IEEE Journal of Selected Topics in Applied Earth Observations and Remote Sensing, 6, 1807-1816.

Pulvirenti, L.; Chini, M.; Pierdicca, N.; Boni, G. Use of sar data for detecting floodwater in urban and agricultural areas: The role of the interferometric coherence. IEEE Trans. Geosci. Remote Sens. 2016, 54, 1532-1544.

Pulvirenti, L.; Pierdicca, N.; Chini, M.; Guerriero, L. An algorithm for operational flood mapping from synthetic aperture radar (sar) data using fuzzy logic. Nat. Hazards Earth Syst. Sci. 2011, 11, 529.

Qing Yang, Xinyi Shen, Emmanouil N. Anagnostou, Chongxun Mo, Jack R. Eggleston, and Albert J. Kettner, "A High-Resolution Flood Inundation Archive (2016-the Present) from Sentinel-1 SAR Imagery over CONUS", Bulletin of American Meteorological Society (under 2nd review).

Refice, A.; Capolongo, D.; Pasquariello, G.; D'Addabbo, A.; Bovenga, F.; Nutricato, R.; Lovergine, F.P.; Pietranera, L. Sar and insar for flood monitoring: Examples with cosmo-skymed data. IEEE J. Sel. Top. Appl. Earth Obs. Remote Sens. 2014, 7, 2711-2722.

Sahoo, B., and Bhaskaran, P. K., 2018: A comprehensive data set for tropical cyclone storm surge-induced inundation for the east coast of India. Int. J. Climatol, 38: 403-419, doi:10.1002/joc.5184.

Santoro, M.; Wegmuller, U. Multi-temporal sar metrics applied to map water bodies. In Proceedings of the 2012 IEEE International Conference on Geoscience and Remote Sensing Symposium (IGARSS), Munich, Germany, Jul. 22-27, 2012; pp. 5230-5233.

Schroeder, R., McDonald, K.C., Chapman, B., Jensen, K., Podest, E., Tessier, Z., Bohn, T.J. and Zimmerman, R., 2014. Development and evaluation of a multi-year inundated land surface data set derived from active/passive microwave remote sensing data. Remote Sens., 7(12), 16668-16732, doi: 10.3390/rs71215843.

Schumann, G.J.-P.; Moller, D.K. Microwave remote sensing of flood inundation. Phys. Chem. Earthparts A/B/C 2015, 83, 84-95.

Seipp, K., Ochoa, X., Gutiérrez, F. & Verbert, K. A research agenda for managing uncertainty in visual analytics. Gesellsch. Inform. 1-10 (Human Factors in Information Visualization and Decision Support Systems (HFIDSS), Mensch und Computer Workshopband, 2016).

(56) References Cited

OTHER PUBLICATIONS

Shastry, A., and Durand, M., 2019: Utilizing flood inundation observations to obtain floodplain topography in data-scarce regions. Front. Earth Sci., 6, 1-10, doi: 0.3389/feart.2018.00243.

Shen, X., & Anagnostou, E.N. (2017). A Framework to Improve Hyper-Resolution Hydrologic Simulation in Snow-Affected Regions. Journal of Hydrology, 552, 1-12.

Shen, X., Anagnostou, E. N., Allen, G. H., Brakenridge, G. R. and Kettner, A. J, 2019b: Near Real-Time Nonobstructed Flood Inundation Mapping by Synthetic Aperture Radar. Remote Sens. Environ., 221, 302-315, doi:10.1016/j.rse.2018.11.008.

Shen, X., Wang D, Mao K, Anagnostou, E. N. and Hong Y, 2019a: Inundation Extent Mapping by Synthetic Aperture Radar: A Review. Remote Sensing, 11(7): 879-895, doi:10.3390/rs11070879.

Shen, X.; Anagnostou, E. Rapid sar-based flood-inundation extent/depth estimation. In Proceedings of the AGU Fall Meeting 2018, Washington, DC, USA, Dec. 11-15, 2018.

Shen, X.; Anagnostou, E.N.; Mei, Y.; Hong, Y. A global distributed basin morphometric dataset. Sci. Data 2017, 4, 160124.

Shen, X.; Hong, Y.; Zhang, K.; Hao, Z. Refining a distributed linear reservoir routing method to improve performance of the crest model. J. Hydrol. Eng. 2016, 22, 04016061-1.

Shen, X.; Mei, Y.; Anagnostou, E.N. A comprehensive database of flood events in the contiguous united states from 2002 to 2013. Bull. Am. Meteorol. Soc. 2017, 98, 1493-1502.

Shen, X.; Vergara, H.J.; Nikolopoulos, E.I.; Anagnostou, E.N.; Hong, Y.; Hao, Z.; Zhang, K.; Mao, K. Gdbc: A tool for generating global-scale distributed basin morphometry. Environ. Model. Softw. 2016, 83, 212-223.

Shoshany, M. Knowledge based expert systems in remote sensing task: quantifying gains from intelligent inference. Int. Soc. Photogramm. Remote Sens. Arch. XXXVII (B7) 1085-1088, http://www.isprs.org/proceedings/XXXVII/congress/7_pdf/6_WG-VII-6/06.pdf (XXIst ISPRS Congress, Technical Commission VII, 2008).

Simley, J.D.; Carswell, W.J., Jr. The National Map—Hydrography; U.S. Geological Survey: Reston, VA, USA, 2009.

Smith, A. R. Color gamut transform pairs. Comput. Graph. 12, 12-19 (1978).

Song, Y.-S.; Sohn, H.-G.; Park, C.-H. Efficient water area classification using radarsat-1 sar imagery in a high relief mountainous environment. Photogramm. Eng. Remote Sens. 2007, 73, 285-296.

Stewart, S. R., 2017: NHC Tropical Cyclone Report—Hurricane Matthew (AL142016), 96pp, https://www.nhc.noaa.gov/data/tcr/AL142016_Matthew.pdf.

Stewart, S. R., and Berg, R., 2019: NHC Tropical Cyclone Report—Hurricane Florence (AL062018), 98pp, https://www.nhc.noaa.gov/data/tcr/AL062018_Florence.pdf.

Subin, Z. M., Riley, W. J. & Mironov, D. An improved lake model for climate simulations: model structure, evaluation, and sensitivity analyses in CESM1. J. Adv. Model. Earth Syst. 4, M02001 (2012).

Takbiri, Z.; Ebtehaj, A.M.; Foufoula-Georgiou, E.J. A multi-sensor data-driven methodology for all-sky passive microwave inundation retrieval. Hydro. Earth Syst. Sci., 2017, 2685-2700.

Tan, Q., Bi, S., Hu, J., & Liu, Z. (2004). Measuring lake water level using multi-source remote sensing images combined with hydrological statistical data. In, Geoscience and Remote Sensing Symposium, 2004. IGARSS'04. Proceedings. 2004 IEEE International (pp. 4885-4888): IEEE.

Tarboton D.G., 1989: The analysis of river basins and channel networks using digital terrain data. Massachusetts Institute of Technology. Dept. of Civil Engineering. Ph.D. Massachusetts Institute of Technology.

Tarboton D.G., 1997: A new method for the determination of flow directions and upslope areas in grid digital elevation models. Water Resour. Res., 33:309-319,doi:org/10.1029/96WR03137.

Townsend, P.A. (2001). Mapping seasonal flooding in forested wetlands using multi-temporal Radarsat SAR. Photogrammetric engineering and remote sensing, 67, 857-864.

Töyrä, J., Pietroniro, A., Martz, L.W., & Prowse, T.D. (2002). A multi-sensor approach to wetland flood monitoring. Hydrological processes, 16, 1569-1581.

Tulbure, M. G., Broich, M., Stehman, S. V. & Kommareddy, A. Surface water extent dynamics from three decades of seasonally continuous Landsat time series at subcontinental scale in a semi-arid region. Remote Sens. Environ. 178, 142-157 (2016).

Twele, A., Cao, W., Plank, S., & Martinis, S. (2016). Sentinel-1-based flood mapping: a fully automated processing chain. International Journal of Remote Sensing, 37, 2990-3004.

U.S. Fish and Wildlife Service, 2020: National Wetlands Inventory, accessed Jun. 10, 2020, http://www.fws.gov/wetlands/Data/Data-Download.html.

UNITAR, 2018: International Charter Space and Major Disasters Activation for Floods in Somalia, accessed May 7, 2018, https://disasterscharter.org/web/guest/activations/-/article/flood-in-somalia-activation-570-.

UNITAR, 2020: International Charter Space and Major Disasters Activation for Floods in Somalia, accessed Apr. 28, 2020, https://disasterscharter.org/web/guest/activations/-/article/flood-large-in-somalia-activation-650-.

United Nations Department of Economic and Social Affairs, Population Division. World Population Prospects: The 2015 Revision, Key Findings and Advance Tables. Working Paper No. ESA/P/WP. 241, https://esa.un.org/unpd/wpp/publications/files/key_findings_wpp_2015.pdf (United Nations, 2015).

U.S. Department of Commerce, NOAA, 2019: "Spring Flooding Summary 2019". https://www.weather.gov/dvn/summary_SpringFlooding_2019.

USGS, Shuttle Radar Topography Mission (SRTM) 1 Arc-Second Global https://lta.cr.usgs.gov/SRTM1Arc (Land Processes Distributed Active Archive Center (LP DAAC), USGS/EROS, accessed Nov. 2016).

USGS, Shuttle Radar Topography Mission Water Body Data https://lta.cr.usgs.gov/srtm_water_body_dataset (SRTM Water Body Data (SWBD), 2003).

Van Dijk, A. I. et al. The Millennium Drought in southeast Australia (2001-2009): natural and human causes and implications for water resources, ecosystems, economy, and society. Wat. Resour. Res. 49, 1040-1057 (2013).

Verpoorter, C., Kutser, T., Seekell, D. A. & Tranvik, L. J. A global inventory of lakes based on high-resolution satellite imagery. Geophys. Res. Lett. 41, 6396-6402 (2014).

Vogelmann, J.E., Howard, S.M., Yang, L., Larson, C.R., Wylie, B.K., & Van Driel, N. (2001). Completion of the 1990s National Land Cover Data Set for the conterminous United States from Landsat Thematic Mapper data and ancillary data sources. Photogrammetric Engineering and Remote Sensing, 67.

Vörösmarty, C. J et al. Global threats to human water security and river biodiversity. Nature 467, 555-561 (2010).

Vörösmarty, C. J et al. in Millennium Ecosystem Assessment vol. 1 Ecosystems and Human Well-being: Current State and Trends Ch. 7, 165-207, http://www.unep.org/maweb/documents/document.276.aspx.pdf (Island Press, 2005).

Vörösmarty, C. J., Green, P., Salisbury, J. & Lammers, R. B. Global water resources: vulnerability from climate change and population growth. Science 289, 284-288 (2000).

Westerhoff, R. S., Kleuskens, M. P. H., Winsemius, H. C., Huizinga, H. J., Brakenridge, G. R., and Bishop, C., 2013: Automated global water mapping based on wide-swath orbital synthetic-aperture radar. Hydrol. Earth Syst. Sci., 17, 651-663, doi:10.5194/hess-17-651-2013.

Wing, O. E. J., Bates, P. D., Sampson, C. C., Smith, A. M., Johnson, K. A., and Erickson, T. A., 2017: Validation of a 30 m resolution flood hazard model of the conterminous United States. Water Resour. Res., 53(9), 7968-7986. doi:10.1002/2017WR020917.

Wing, O.E.; Bates, P.D.; Smith, A.M.; Sampson, C.C.; Johnson, K.A.; Fargione, J.; Morefield, P. Estimates of present and future flood risk in the conterminous united states. Environ. Res. Lett. 2018, 13, 034023.

Wing, O.E.J., Pinter, N., Bates, P.D et al. 2020: New insights into US flood vulnerability revealed from flood insurance big data. Nat Commun, 11, 1444. doi:org/10.1038/s41467-020-15264-2.

(56) References Cited

OTHER PUBLICATIONS

Woodcock, C. E. et al. Free access to Landsat imagery. Science 320, 1011 (2008).
World Economic Forum. The Global Risks Report 2016 11th edn, http://www3.weforum.org/docs/Media/TheGlobalRisksReport2016.pdf (World Economic Forum, 2016).
Wulder, M. A. et al. Opening the archive: how free data has enabled the science and monitoring promise of Landsat. Remote Sens. Environ. 122, 2-10 (2012).
Wulder, M. A. et al. The global Landsat archive: status, consolidation, and direction. Remote Sens. Environ. 185, 271-283 (2016).
Xiong, J., Thenkabail, P.S., Tilton, J.C., Gumma, M.K., Teluguntla, P., Oliphant, A., Congalton, R.G., Yadav, K., & Gorelick, N. (2017). Nominal 30-m Cropland Extent Map of Continental Africa by Integrating Pixel-Based and Object-Based Algorithms Using Sentinel-2 and Landsat-8 Data on Google Earth Engine. Remote Sensing, 9, 1065.
Yamada, Y. (2001). Detection of flood-inundated area and relation between the area and microgeomorphology using SAR and GIS. In, Geoscience and Remote Sensing Symposium, 2001. IGARSS'01. IEEE 2001 International (pp. 3282-3284): IEEE.
Yamaguchi, Y.; Moriyama, T.; Ishido, M.; Yamada, H. Four-component scattering model for polarimetric sar image decomposition. IEEE Trans. Geosci. Remote Sens. 2005, 43, 1699-1706.
Yamazaki, D., Kanae, S., Kim, H., & Oki, T. (2011). A physically based description of floodplain inundation dynamics in a global river routing model. Water Resources Research, 47, W04501.
Yamazaki, D., O'Loughlin, F., Trigg, M.A., Miller, Z.F., Pavelsky, T.M., & Bates, P.D. (2014). Development of the global width database for large rivers. Water Resources Research, 50, 3467-3480.
Yamazaki, D., Trigg, M. A. & Ikeshima, D. Development of a global ~90m water body map using multi-temporal Landsat images. Remote Sens. Environ. 171, 337-351 (2015).
Yamazaki, D.; Ikeshima, D.; Tawatari, R.; Yamaguchi, T.; O'Loughlin, F.; Neal, J.C.; Sampson, C.C.; Kanae, S.; Bates, P.D. A high-accuracy map of global terrain elevations. Geophys. Res. Lett. 2017, 44, 5844-5853.
Yang, J.-B. & Xu, D. L. On the evidential reasoning algorithm for multiple attribute decision analysis under uncertainty. IEEE Trans. Syst. Man Cybern. A 32, 289-304 (2002).
Zafarnejad, F. The contribution of dams to Iran's desertification. Int. J. Environ. Stud. 66, 327-341 (2009).
Zanter, K., 2019: Landsat Dynamic Surface Water Extent (DSWE) Product Guide. Version 3.0, 27pp, <https://prd-wret.s3.us-west-2.amazonaws.com/assets/palladium/production/s3fs-public/atoms/files/LSDS-1331-LandsatDynamicSurfaceWaterExtent-DSWE-ProductGuide-v3.0_%202019_03_19.pdf.>.
Zeng, Z., Gan, Y., Kettner, A. J., Yang, Q., Zeng, C., Brakenridge, G. R. and Hong, Y., 2020: Towards high resolution flood monitoring: An integrated methodology using passive microwave brightness temperatures and Sentinel synthetic, J. Hydrol, 582, 124377, doi:10.1016/j.jhydrol.2019.124377.
Zhang, Y., Li, B. & Zheng, D. Datasets of the boundary and area of the Tibetan Plateau., ACTA Geographica Sinica, 2014, 69:164-68.
Zheng, X.; Lin, P.; Keane, S.; Kesler, C.; Rajib, A. Nhdplus-Hand Evaluation; Consortium of Universities for the Advancement of Hydrologic Science, Inc.: Boston, MA, USA, 2016; p. 26-36.
Zhou, C., Luo, J., Yang, C., Li, B., & Wang, S. (2000). Flood monitoring using multi-temporal AVHRR and RADARSAT imagery. Photogrammetric engineering and remote sensing, 66, 633-638.
Zhu, Z. & Woodcock, C. E. Object-based cloud and cloud shadow detection in Landsat imagery. Remote Sens. Environ. 118, 83-94 (2012).
Havnø, K., Madsen, M., Dørge, J., & Singh, V. (1995). Mike 11-a generalized river modelling package. Computer models of watershed hydrology., 733-782.
Baatz, M. (1999). Object-oriented and multi-scale image analysis in semantic networks. In, Proc. the 2nd International Symposium on Operationalization of Remote Sensing, Enschede, ITC, Aug. 1999.
Merwade, V.; Rajib, A.; Liu, Z. An integrated approach for flood inundation modeling on large scales. In Bridging Science and Policy Implication for Managing Climate Extremes; Jung, H.-S., Wang, B., Eds.; World Scientific Publication Company: Singapore, 2018; pp. 133-155.
NOAA National Centers for Environmental Information (NCEI), 2016: Storm Events Database, accessed Apr. 15, 2020, https://www.ncdc.noaa.gov/stormevents/ftp.jsp.
Schumann, G., Henry, J., Hoffmann, L., Pfister, L., Pappenberger, F., & Matgen, P. (2005). Demonstrating the high potential of remote sensing in hydraulic modelling and flood risk management. In, Annual Conference of the Remote Sensing and Photogrammetry Society With the NERC Earth Observation Conference, Remote Sens. and Photogramm. Soc., Portsmouth, UK.
Shen, X.; Hong, Y.; Anagnostou, E.N.; Zhang, K.; Hao, Z. Chapter 7 an advanced distributed hydrologic framework—the development of crest. In Hydrologic Remote Sensing and Capacity Building, Chapter; Hong, Y., Zhang, Y., Khan, S.I., Eds.; CRC Press: Boca Raton, FL, USA, 2016; pp. 127-138.
Shen, X.; Hong, Y.; Qin, Q.; Chen, S.; Grout, T. A backscattering enhanced canopy scattering model based on mimics. In Proceedings of the American Geophysical Union (AGU) 2010 Fall Meeting, San Francisco, CA, USA, Dec. 13-17, 2010.
Ulaby, F.T.; Moore, R.K.; Fung, A.K. Microwave Remote Sensing: Active and Passive; Artech House Inc.: London, UK, 1986; chapter titled "Volume Scattering and Emission Theory," pp. 1066-1077.

\* cited by examiner (a)

(b)

(c)

(d)

(e)

(f)

SYSTEMS AND METHODS TO GENERATE HIGH RESOLUTION FLOOD MAPS IN NEAR REAL TIME

CROSS-REFERENCE TO RELATED APPLICATIONS

This application is a non-provisional of and claims the benefit of U.S. Provisional Patent Application No. 62/938,017, filed on Nov. 20, 2019, the contents of which are incorporated herein by reference.

FIELD OF INVENTION

The disclosure contained herein is in the general field of satellite-based information systems for mapping of inundation during and soon after flood events.

BACKGROUND

In the event of a flood disaster, first response agencies need inundation maps produced in near real time (NRT). NRT inundation mapping during flood events is vital to support rescue and damage recovery decisions and to facilitate rapid assessment of property loss and damage.

The major constraint up to now on using Satellite Synthetic Aperture Radar (SAR) for NRT inundation mapping has been the inability to process quickly the obtained imagery into reliable flood maps. Flood water detection using SAR data can be categorized into six approaches: (1) unsupervised versus supervised; (2) threshold determination; (3) segmentation; (4) change detection; (5) visual inspection and manual editing versus fully automated processes; and (6) open water/closed water detection beneath vegetation or in urban areas blocked by buildings.

While several studies have combined several of these methods to detect flooded areas, most can be classified as supervised, due to the required training of the processing algorithm (Borghys et al. 2006; Kussul et al. 2008; Pulvirenti et al. 2010; Song et al. 2007; Toyra et al. 2002; Townsend 2001; Zhou et al. 2000). Although reported to be more accurate, supervised classification is tuned to local circumstances, and its accuracy is affected by the levels of expertise available during training-set selection. Most importantly, the supervised approaches cannot be readily automated (Manavalan 2017). This remains a major challenge.

SUMMARY

The disclosure provides a system and method to generate flood inundation maps. The system includes a plurality of computer processing modules: a flood trigger system, a SAR data query system, and a RAPID kernel algorithm system, running in real time, to identify the potential flood zones, query SAR data, and finally compute the inundation maps, respectively. As disclosed herein, the RAPID kernel algorithm is extended to a fully automated flood mapping system that requires no human interference from the initial flood events discovery to the final flood map production.

The flood trigger system identifies flood occurring zones and allows identifying what Sentinel-1 images should be processed. This saves computational resources and storage, and allows automation. The flood trigger system combines above-flood-stage information from about 4,400 U.S. Geological Survey monitoring stations and cumulative IMERG precipitation (G. Huffman et al. 2014) at daily scale. (IMERG is the Integrated Multi-satellitE Retrievals for GPM; GPM is the Global Precipitation Measurement operation of NASA.) The IMERG precipitation is particularly important for triggering outside the CONUS area where we lack in situ observations. (CONUS refers to the continental United States.)

The SAR data query system provides access to high resolution images of the Earth. Mapping techniques were developed that rely on SAR on-board earth-orbiting platforms. SAR provides valid ground surface measurements through cloud cover with high resolution and sampling frequency that has recently increased through multiple missions. Despite numerous efforts, automatic processing of SAR data to derive accurate inundation maps still poses challenges.

To address them, an NRT system named RAdar-Produced Inundation Diary (RAPID) was developed. The RAPID kernel algorithm system integrates four processing steps: classification based on statistics, morphological processing, multi-threshold-based compensation, and machine-learning correction. Besides SAR data, the system integrates multi-source remote-sensing data products, including land cover classification, water occurrence, hydrographical, water type, and river width products. In comparison to expert handmade flood maps, the fully-automated RAPID system exhibited "overall," "producer," and "user" accuracies of 93%, 77%, and 75%, respectively. RAPID accommodates commonly encountered over- and under-detections caused by noise-like speckle, water-like radar response areas, strong scatterers, and isolated inundation areas—errors that are in common practice to ignore, mask out, or be filtered out by coarsening the effective resolution.

The RAPID system can serve as the kernel algorithm to derive flood inundation products from satellites—both existing and to be launched—equipped with high-resolution SAR sensors, including Envisat, Radarsat, NISAR, Advanced Land Observation Satellite (ALOS)-1/2, Sentinel-1, and TerraSAR-X.

For purposes of this disclosure, NRT is defined as a lag of no more than one day (e.g., 24 hours) from the time of acquiring data on flood conditions to the publication or other availability of a flood map. In some embodiments of the disclosed system and methods, flood maps are produced within 12 hours of data acquisition.

Unlike optical sensors, synthetic aperture radar (SAR) provides its own illumination of the Earth's surface and thus can image day and night, as well as through cloud cover. In addition, SAR's spatial resolution can be very high (~1-2 m), so its potential for flood inundation mapping during storms and hurricanes is also very high.

In some embodiments, the disclosure describes a system that saves time, money, and manpower because the system is fully automated and computerized requiring no human interference. Existing methods require skilled operators for manual processing and cannot succeed with SAR images without showing bimodal histogram (has a higher failure rate).

The delineation of potential flood zones (PFZ)s are based on precipitation or streamflow station observations, makes the pathway to the NRT response and ensures to contain all satellite captured flood events.

With this method applied on SAR imageries, stakeholders can obtain flood maps in any weather condition or nighttime. Therefore, this technique can have the best chance to capture the actual full inundation extent, which is currently not possible by optical satellite data.

As described herein, the technique reduces error by integrating multi-source remote sensing and hydrography data/product and employing the so-called temporal filtering technique instead of spatial filtering. Consequently, flood inundation details at satellite original (10 m in the case of Sentinel-1) spatial resolution are retained from SAR. Existing methods either produce very noisy results, which cannot be directly applied or use large spatial window sizes to filter the noise at the cost of losing valuable details.

In one embodiment, the invention provides a system to generate a flood inundation map. The system comprises a flood trigger system configured to identify a flood occurring zone having one or more bodies of water, a SAR data query system to identify relevant satellite images for the flood occurring zones, and a kernel algorithm system. The kernel algorithm system includes an electronic processor configured to receive the data from the flood trigger system, receive the satellite images from the SAR data query system, generate a binary classification of water and non-water at pixel level of the satellite images, morphologically process the satellite images to reduce over-detection of the bodies of water and to reduce under-detection of the bodies of water, apply a multi-threshold compensation to reduce speckle noise in the bodies of water, apply machine learning-based correction for speckle, and generate a flood inundation map.

In another embodiment the invention provides a method of generating a flood inundation map in near real time. The method comprises identifying, with an electronic processor, a flood event, retrieving, with an electronic processor, a plurality of satellite images of an area defined by the flood event, receiving, by a kernel algorithm system, the satellite images. The kernel algorithm system is configured to apply a water identifier or a non-water identifier for each of the pixels in the satellite images, morphologically process the satellite images to reduce over-detection of the bodies of water and to reduce under-detection of the bodies of water, apply a multi-threshold compensation to reduce speckle noise in the bodies of water, apply machine learning-based correction for speckle, and generate a flood inundation map.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
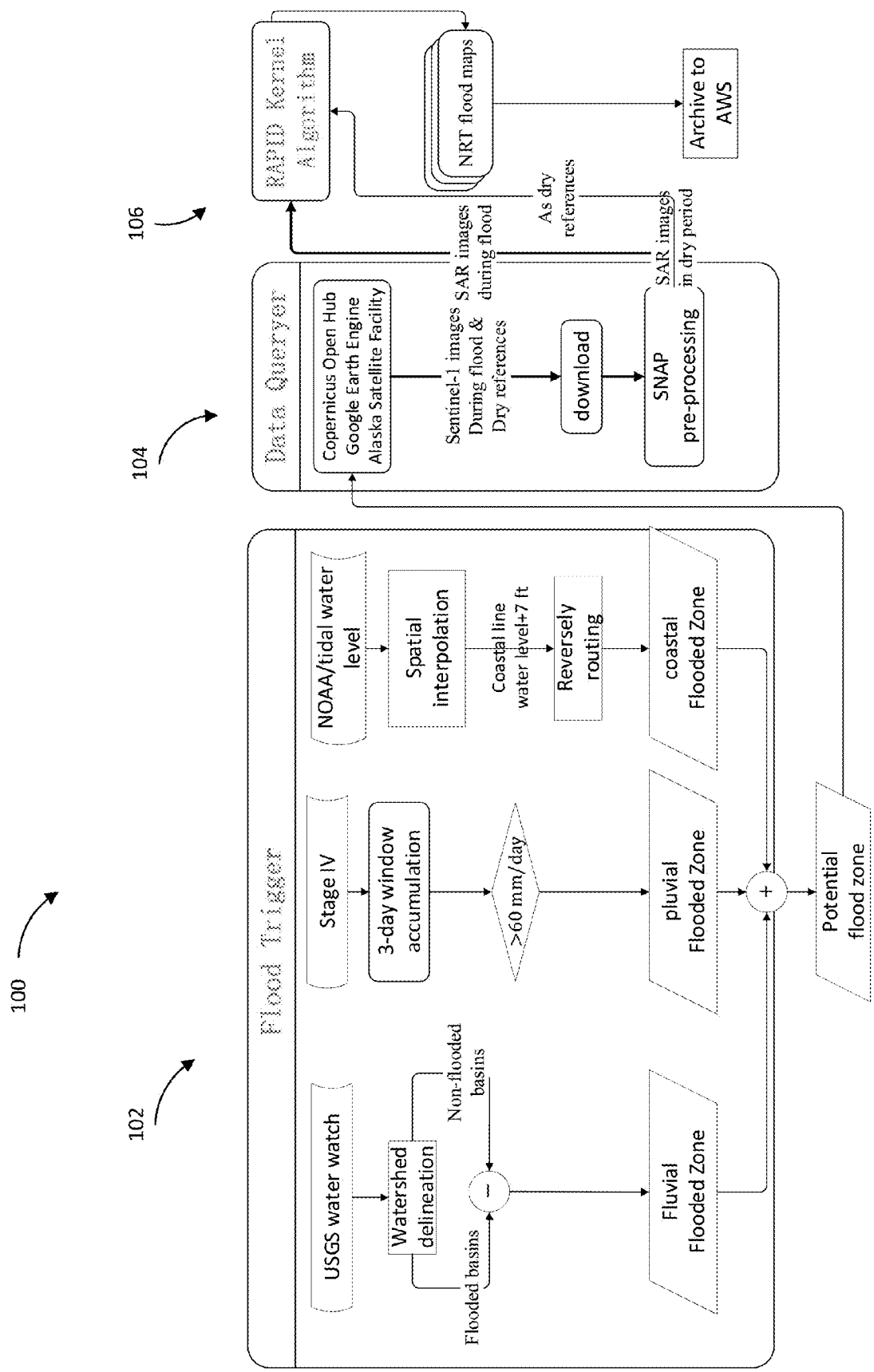
FIG. 1 schematically illustrates a system to generate flood inundation maps in NRT.

[data source: (FEMA, 2019)] during January 2016 to June 2019. In (b), a day of a given cell is flooded if its inundation fraction exceeds 1%.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware- and software-based devices, as well as a plurality of different structural components may be utilized to implement the invention. In addition, embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software (for example, stored on non-transitory computer-readable medium) executable by one or more processors. As such, it should be noted that a plurality of hardware- and software-based devices, as well as a plurality of different structural components, may be utilized to implement the invention. For example, "mobile device," "computing device," and "server" as described in the specification may include one or more electronic processors, one or more memory modules including non-transitory computer-readable medium, one or more input/output interfaces, and various connections (for example, a system bus) connecting the components.

Disclosed herein is a fully automated information processing chain to delineate flood maps at high resolution (~10 m) without requiring any human interference. The flood maps are produced in NRT.

SAR data is considered most suitable for flood inundation mapping, yet there is no automated processing chain currently available because the data processing is complicated and post-human interference has been the current practice to ensure the product's quality.

The disclosure is a standalone SAR data processing framework (tool) to generate flood inundation maps. The output from this SAR data processing framework can be provided to client/customer entities as a service operation through which flood information is provided in near-real-time.

FIG. 1 illustrates a system to generate flood inundation maps 100. The system 100 includes a flood trigger system 102, a SAR data query system 104, and a RAPID kernel algorithm system 106. The flood trigger system 102 identifies flood occurring zones and allows identifying what Sentinel-1 images should be processed. This saves computational resources and storage, and allows automation. The flood trigger system 102 combines above-flood-stage information from about 4,400 U.S. Geological Survey monitoring stations and cumulative IMERG precipitation (G. Huffman et al. 2014) at daily scale. (IMERG is the Integrated Multi-satellitE Retrievals for GPM; GPM is the Global Precipitation Measurement operation of NASA.) The IMERG precipitation is particularly important for triggering outside the CONUS area where we lack in situ observations. (CONUS refers to the continental United States.)

The SAR data query system 104 provides access to high resolution images of the Earth. Mapping techniques were developed that rely on synthetic aperture radar (SAR) on-board earth-orbiting platforms. SAR provides valid ground surface measurements through cloud cover with high resolution and sampling frequency that has recently increased through multiple missions. Despite numerous efforts, automatic processing of SAR data to derive accurate inundation maps still poses challenges.

SAR Imagery Classification to Water and Land

Different from the estimation of surface parameters (such as soil moisture), inundation mapping is simply the identification of a highly accurate binary mask of water and non-water. A review of previous work on inundation mapping, most of which has involved methods for which an automated approach was difficult or impossible, is discussed below.

The specular reflective properties of open still water in SAR sensing motivated several efforts (Giustarini et al. 2013; Hirose et al. 2001; Matgen et al. 2011; Yamada 2001) to determine a threshold below which pixels are identified as water. It was understood that a single threshold might not hold well with large-area water bodies (Tan et al. 2004) or the entire swath of SAR images due to the variability of the environment with regard to, for example, wind roughening and satellite system parameters (Martinis et al. 2009). Martinis and Rieke (2015) produced spatial and temporal back-scattering heterogeneity, even for permanent water bodies.

To address spatial variability, Martinis et al. (2009) applied a split-based approach (SBA), together with object-oriented (OO) segmentation (Baatz 1999). Martinis et al. (2015) further combined SBA with fuzzy logic-based refinement to construct an automated processing chain (Twele et al. 2016). Matgen et al. (2011) developed a histogram segmentation method, and Giustarini et al. (2013) automated the calibration process for segmentation and region-growing thresholds. Essentially, threshold-based approaches need either a bimodal histogram of the pixels or some sample data to initialize the water distribution. For more general situations, when the histogram of the pixels is not bimodal, a straightforward option is to draw training regions of interest (ROIs) manually; but, again, this impedes automation. The SBA method, on the other hand, ensures that only the splits that show a bimodal histogram (water versus non-water pixels) are used to derive the global threshold; and Lu et al. (2014) loosened the restriction to bimodal histograms by initializing the water distribution using a "core flooding area," automatically derived from change detection using multi-temporal SAR images. Change detection (Bazi et al. 2005; Giustarini et al. 2013; Hirose et al. 2001; Lu et al. 2014; Matgen et al. 2011; Santoro and Wegmüller 2012; Yamada 2001) is also used to select only significantly changed pixels as inundation candidates to reduce false classification of water (hereafter referred to as "false positives").

In contrast to pixel-based threshold determination, image segmentation-based techniques identify water bodies on continuous and non-overlapping objects. The active contour method (ACM) (Horritt 1999; Horritt et al. 2001) allows a certain amount of backscattering heterogeneity within a water body and incorporates morphological metrics, such as curvature and tension. Martinis et al. (2009) applied OO with SBA to reduce false positives and speckle. In a comparison of the ACM and OO, Heremans et al. (2003) concluded that the latter delineated more accurately while the former tended to identify large water areas better. Pulvirenti et al. (2011a) provided an image segmentation method that consisted of dilation and erosion operators and employed a microwave scattering model (Bracaglia et al. 1995), which coupled matrix doubling (Fung 1994; Ulaby et al. 1986) and the integral equation model (IEM) (Fung 1994; Fung et al. 1994) to interpret the backscattering signature at object level. (Giustarini et al. 2013; Lu et al. 2014; Matgen et al. (2011)) employed a region-growing algorithm to extend the inundation area from detected water pixels.

Inundation detection also encounters vegetated areas, partially submerged wetlands, and urban areas. Theoretically, dihedral scattering is enhanced during a flood if a vegetal stalk structure exists. Ormsby et al. (1985) evaluated the backscattering difference caused by flooding under vegetation. Martinis and Rieke (2015) analyzed the sensitivity of multi-temporal/frequency SAR data to flooding conditions under different land cover conditions and concluded that the X-band radar is only suitable to detect inundation beneath sparse vegetation or forest during leaf-off period, whereas L-band, though with better penetration, has a wider range of backscattering enhancement, which reduces the reliability of the classification. Kasischke et al. (2003) analyzed the backscattering change of ERS-2 SAR from a dry to an inundated situation by comparing with a scattering model and concluded the decrease was not as great as predicted. Townsend (2001) utilized ground truth to train a decision tree to identify flooding beneath forest using Radarsat-1 SAR. Horritt et al. (2003) used two radar signatures as input for the ACM, the enhanced backscattering at C-band and the HH-VV phase difference, to generate two water contours from selected known open-water (ocean) and dryland (coastal) pixels. Then the area between the two contours was labeled "flooded vegetation." Pulvirenti et al. (2010) trained a set of rules using visually interpreted regions of interest (ROIs) to extract flooded forest and urban areas from COSMO-SkyMed SAR data. Also using COSMO-SkyMed, Pulvirenti et al. (2013) combined their fuzzy logic classifier (Pulvirenti et al. 2011b) and segmentation method (Pulvirenti et al. 2011a) to monitor flood evolution in vegetated areas.

Given the potential for flood detection under vegetation using SAR data, most of these efforts were based on supervised classification, which is almost impossible to automate. One explanation for the preference for supervised classification over an automated threshold determination method is the vegetation heterogeneity: the enhanced dihedral scattering of vegetation cannot be considered as a single class because of the presence of different vegetation species and structure and leaf-off and leaf-on conditions. Such heterogeneity makes it difficult to find a threshold of backscattering enhancement automatically. In other words, detecting flooding beneath vegetation requires identification of multiple classes from an image, but current automatic methods based on threshold determination are only able to discern one.

Segmentation methods present other difficulties. The initial seeds (water lines) needed by the ACM may not be identified for inundated areas that are not connected to a known water source; image dilation and erosion-based methods can smooth out details while reducing speckle; and the OO algorithm, besides the subjective process of determining the scaling factor, was not designed for SAR and is therefore not resistant to speckle. Comparison to microwave scattering models can be affected by the models' poor accuracy, caused by the lack of ground truth (soil and vegetation parameters) (Pulvirenti et al. 2013).

Only a few studies are available on flood mapping in urban areas (Giustarini et al. 2013; Martinis et al. 2009; Mason et al. 2012; Mason et al. 2010), and only one (Mason et al. 2014) investigated the use of dihedral scattering to extract flooding in areas enhanced by buildings. The vertical structure of buildings can resemble vegetation in SAR images, but it is rotationally asymmetric in comparison with a canopy trunk, which prohibits enhancement from occurring from all directions of sight. As a result, scattering enhancement only occurs at some orientations. In addition, smooth impervious surfaces and shadow areas in cities may cause over-detection. More accurate detection of water, therefore, requires knowledge of geometry, the orientation and materials of buildings, and the direction of radar illumination (Ferro et al. 2011)—information that is challenging to acquire for many cities. Another consideration is expense. Ultra-high-resolution SAR data (~1 m) such as TerraSAR-X and COSMO-SkyMed, which are suitable for inundation mapping in urban areas, are commercial and, therefore, costly.

Issues for an Automated Flood Mapping System

Existing algorithms to detect flooding unobstructed by structures or vegetation have, as yet, only partially addressed the operational demands of NRT inundation mapping in terms of automation and accuracy. The issues are summarized as follows:

Manual labor is needed to reduce over-detection caused by smooth surface and shadow areas (referred to hereafter as water-like surfaces) and under-detection resulting from strong scatter disturbances and speckle-caused noise. Skilled operators are needed to accomplish such manual editing.

Assembled segmentation using a region-growing algorithm (RGA) cannot capture the large isolated and scattered flooded areas that may, at times, become disconnected from the pre-flooded water bodies due to variability in surface elevation and barriers after the flood peak. Water paths too narrow to detect or covered by vegetation may appear isolated from known water sources—a limit of sensor spatial resolution. Bottom to top segmentation is affected by speckle. Neither method works where actual water areas are connected to water-like areas.

Change detection, designed to eliminate over-detection, may contain significant errors caused by noise-like speckle, geometric dislocation, or shadow areas that change with the direction of radar sight. Expected location error can be a few (1-3) pixels after geo-referencing of SAR data. Exact-repeat images (from the same orbits and, thus, radar sight direction) reduce these errors, however.

Comparison with a scattering model might be inaccurate because ground parameters of vegetation are required by these models but are not available. Scattering models are also complicated to use by those with less applicable technical training.

Spatial filtering, which was used in most of the aforementioned studies, will coarsen the resolution of the result and reduce valuable details along water boundaries.

To address these issues, a fully automated, radar-produced inundation diary (RAPID) system to detect open flood extent was developed. Operating in NRT, RAPID fully integrates radar polarimetry, SAR statistics, morphology, and machine-learning methods to address the identified issues in detecting open flood water. No individual operator attention is needed, although RAPID does not detect flooding under vegetation due to difficulties outlined above. As discussed below, the four automated processing steps are described and show the advantage of synergies of multisource ancillary data, including high-resolution topography, high-resolution water occurrence, land cover classification (LCC), and river width, hydrography, and water type databases.

Figure 2:
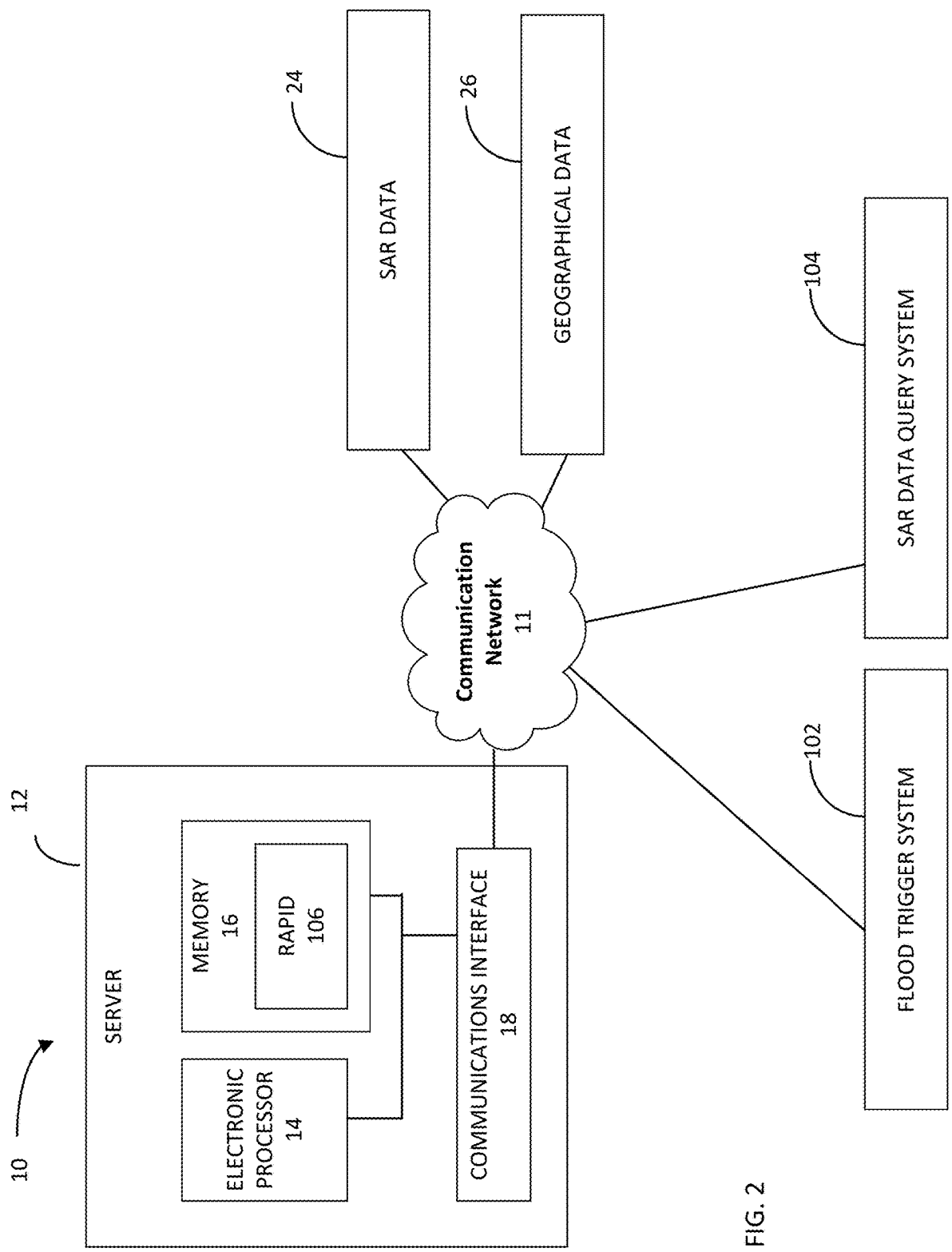
FIG. 2 schematically illustrates a system to generate flood inundation maps in NRT.

As noted above, the RAPID kernel algorithm system 106 provides a system to generate flood inundation maps in NRT. For example, FIG. 2 schematically illustrates a system to generate flood inundation maps 10 according to some embodiments of the invention. The system 10 includes a server 12 that includes a plurality of electrical and electronic components that provide power, operational control, and protection of the components within the server 12. For example, as illustrated in FIG. 2, the server 12 includes an electronic processor 14 (a microprocessor, application-specific integrated circuit (ASIC), or another suitable electronic device), a memory 16 (a non-transitory, computer-readable storage medium), and a communications interface 18. The electronic processor 14, the memory 16, and the communications interface 18 communicate over one or more connections or buses. It should be understood that the server 12 illustrated in FIG. 2 represents one example of a server and embodiments described herein may include a server with additional, fewer, or different components than the server 12 illustrated in FIG. 2. Also, in some embodiments, the server 12 performs functionality in addition to the functionality described herein. Similarly, the functionality performed by the server 12 (through execution of instructions by the electronic processor 14) may be distributed among multiple servers (including servers included a cloud-based computing system or service). Accordingly, functionality described herein as being performed by the electronic processor 14 may be performed by one or more electronic processors included in the server 12, external to the server 12, or a combination thereof.

The memory 16 may include read-only memory (ROM), random access memory (RAM) (for example, dynamic RAM (DRAM), synchronous DRAM (SDRAM), and the like), electrically erasable programmable read-only memory (EEPROM), flash memory, a hard disk, a secure digital (SD) card, other suitable memory devices, or a combination thereof. The electronic processor 14 executes computer-readable instructions ("software") stored in the memory 16. The software may include firmware, one or more applications, program data, filters, rules, one or more program modules, and other executable instructions. For example, the software may include instructions and associated data for performing the methods described herein. For example, as illustrated in FIG. 2, the memory 16 may store the RAPID kernel algorithm system 106 (for example, software) for performing a four-step process to generate a flood inundation map as described herein. It should be understood that the functionality described herein as being performed by the a RAPID kernel algorithm system 106 may be distributed among multiple software modules, hardware components, or a combination thereof stored or included in the server 12 or external to the server 12.

The communications interface 18 allows the server 12 to communicate with devices external to the server 12. For example, as illustrated in FIG. 1, the server 12 may communicate with a SAR database(s) 24 including geolocation and backscattering images and/or a geographical database(s) 26 (e.g., including ancillary geographic and hydrography datasets). In particular, the communications interface 18 may include a port for receiving a wired connection to an external device (for example, a universal serial bus (USB) cable and the like), a transceiver for establishing a wireless connection to an external device (for example, over one or more communication networks 11, such as the Internet, a local area network (LAN), a wide area network (WAN), and the like), or a combination thereof. It should be understood that FIG. 2 illustrates one example of the system 10 and, in some embodiments, the server 12 may communicate with fewer or additional systems and components than illustrated in FIG. 2. For example, the server 12 may be configured to communicate with multiple SAR databases, multiple data sharing systems (of the same SAR database), multiple ancillary geographic and hydrography datasets, or a combination thereof. Also, the systems and components illustrated in FIG. 1 may be combined and distributed in various configurations. For example, in some embodiments, the flood trigger system 102 may include the radar polarimetry Stage IV, IMERG, USGS water watch, simulated stream flow NOAA/tidal water level, or simulated tidal water level, or a combination thereof. In some embodiments, the server 12 may also communicate with one or more user devices (terminals, tablet computers, laptop computers, desktop computers, smart wearables, smart televisions, and the like) that include similar components as the server 12. For example, in some embodiments, a user may interact with the server 12 via a user device to configure the system 10, such as by configuring or customizing the functionality of the server 12 as described herein. Although not illustrated in FIG. 2 or described herein, the SAR database 24, and the geographical database 26 may include similar components as the server 12.

The SAR database 24 stores georeferenced satellite images of the polarized radar backscattering. The geographical and hydrography database 26 stores land use, water occurrence, river width, flow direction and topography data, and the like.

Figure 3:
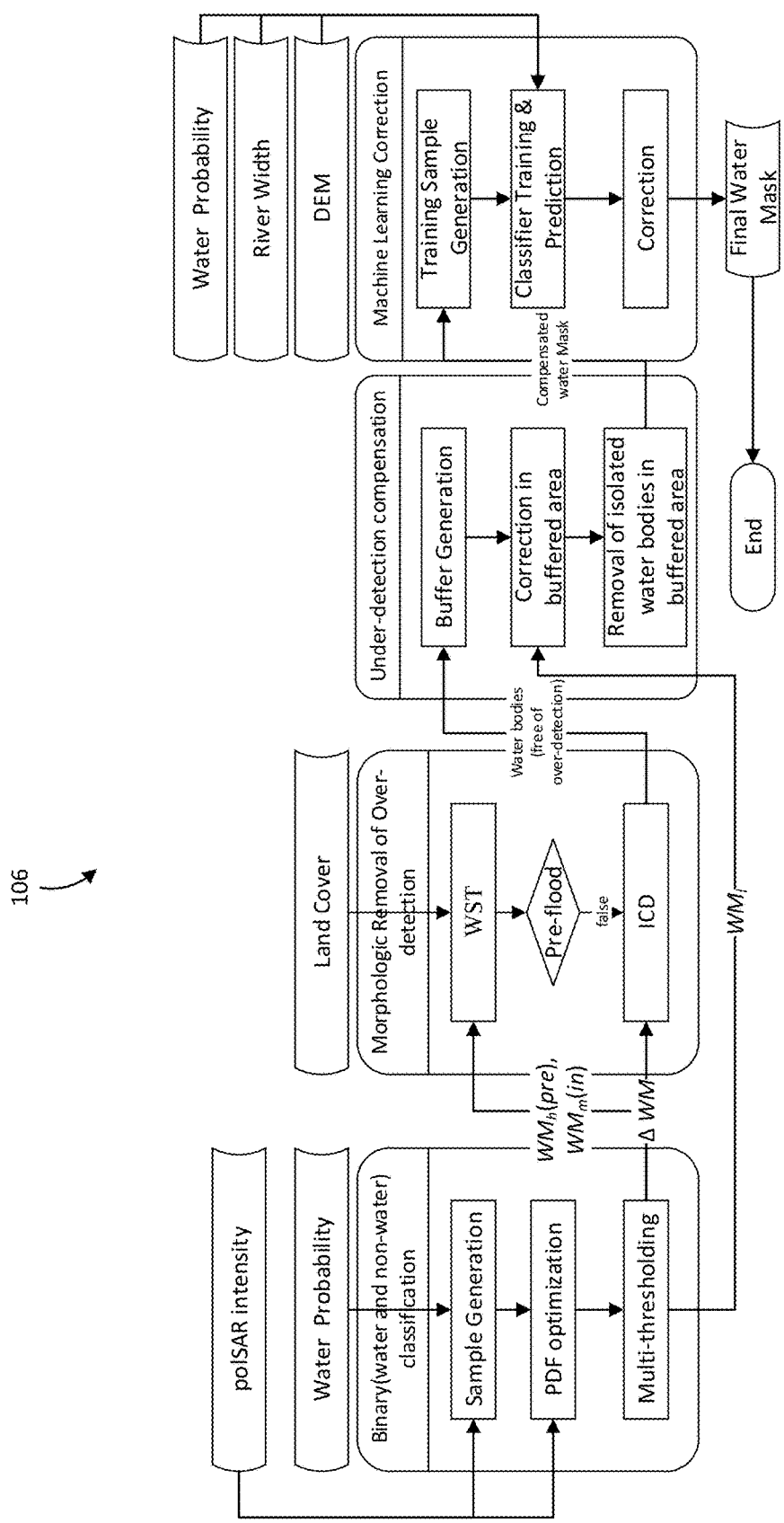
FIG. 3 schematically illustrates the framework of RAPID.

With reference to FIG. 3, the RAPID kernel algorithm system 106 can apply learning (artificial intelligence) to mimic cognitive functions, including but not limited to learning and problem solving. Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs. The computer program may be configured to perform machine learning using various types of methods and mechanisms. For example, the computer program may perform machine learning using decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using all of these approaches, a computer program may ingest, parse, and understand data and progressively refine models for data analytics. Once trained, the computer system may be referred to as an intelligent system, an artificial intelligence (AI) system, a cognitive system, or the like. The RAPID kernel algorithm system 106 may be "trained" using various machine learning techniques. The classified result from the previous steps is used to train the classifier. It is an advantage of RAPID because a user does not have to do manually labeling. Each image learns from itself.

Rather than simply replicating and speeding up existing human processes, computers may simultaneously process multiple tasks and draw upon multiple simultaneous information sources based on interactive rules. Therefore, unlike the human brain, which is largely a serial processor, multi-tasking computer system may simultaneously weigh many factors, and therefore complement or exceed human performance with regard to generating flood inundation maps in NRT.

FIG. 3 schematically illustrates a four-step framework of the RAPID kernel algorithm system 106: (A) binary classification of water and non-water at pixel level, (B) morphological processing, primarily to reduce over- and under-detection at object level, (C) multi-threshold compensation to reduce speckle noise; and (D) machine learning-based correction, utilizing topography and the knowledge of stream network and water type.

Based on a fundamental understanding of developed SAR speckle, it is known that noise-like speckle is not real noise (Lee and Pottier 2009; Ulaby et al. 1982); it is, rather, a strong overlap between water and non-water classes. Consequently, conventional single-threshold methods inevitably cause noisy classification results (Matgen et al. 2006; Matgen et al. 2004), and the common-practice strategy to filter speckle as noise at the price of reducing effective resolution is not recommended as a solution. Therefore, a multi-threshold scheme to reduce the speckle effects is implemented.

Since water-like surfaces share identical scattering properties with water bodies, they cannot be eliminated by only using radar statistics. Using the water masks generated by the three automatically optimized thresholds, the morphological and compensation procedures that significantly suppressed over- and under-detection were discovered. In principle, water sources for large water bodies can be found on a high-resolution LCC map, but they may not be found for small water bodies. To prevent over-detection, morphological processing was applied to trace floodplain inundation from known water sources. To prevent the under-detection of isolated water bodies, improved change detection (ICD) was applied.

Finally, a machine learning-based approach was used to refine the detected water areas. Strong scatterers within water bodies, such as infrastructure and vehicles, can cause significant identification errors in surrounding areas due to long synthetic aperture and wide-band range compression. These errors cannot be addressed by the previous processing steps. To reduce the error caused by strong scatterers and remaining speckle, the machine-learning step integrates information on topography, river network, and water probability and type.

Although a machine-learning procedure usually requires manual collection of training samples, this is not the case in the RAPID system. Since correctly identified pixels dominate the water mask generated by previous steps, the pixels collected for training within a buffered area of water bodies (to include both water and non-water pixels) can be used directly as the training set.

Step A: Binary Classification of Water and Non-Water at Pixel Level

The first step in binary classification is to cluster water pixels from the whole swath of polarimetric SAR images. All water bodies in one swath are hypothesized as homogeneous areas with fully developed speckle. Assuming the measuring surface is reciprocal, the PDF of multi-look backscattering amplitude matrix, A, for a given category can be characterized by the Wishart distribution (Lee and Pottier 2009), reciprocal, the PDF of multi-look backscattering amplitude matrix, A, for a given category can be characterized by the Wishart distribution (Lee and Pottier 2009)

$$p(A) = \frac{|A|^{n-q}}{K(n,q)|C|^n} \exp(-nTr(C^{-1}Z)), \quad (1)$$

where n is the equivalent number of looks (ENL), Tr⟨•⟩ and |•| are the matrix trace and determinant, and the multi-look covariance matrix, Z, is computed by averaging multiple 1-look covariance matrices, $$A = nZ = \sum_{k=1}^{n} u(k)u^H(k), \quad (2)$$

where H represents the conjugate transpose operator, and $\bar{u}$ is the 1-look complex scattering vector (Kostinski and Boerner 1986), $$\bar{u} = [S_{HH}, \sqrt{2} S_{HV}, S_{VV}], \quad (3)$$

and $$K(n,q) = \pi^{\frac{1}{2}q(q+1)} \Gamma(n), \ldots \Gamma(n-q+1), \quad (4)$$

where q is the dimension of vector $\bar{u}$ and takes the value of 3 in reciprocal condition. C is the expectation of the covariance matrix, $$C = E\langle \overline{uu^H} \rangle, \quad (5)$$

where E⟨•⟩ stands for the expectation of a stochastic variable.

In practice, the most available data formats are dual-polarized intensities:

$$I_{1,2} = \frac{1}{n} \sum_{k=1}^{n} |S_{i,j}(k)|^2, i, j \in \{HH, HV, \text{or } VV\}, i \neq j. \quad (6)$$

Carrying out the integral with respect to other variables in (1), we have the PDF of dual-polarized intensities (Hagedorn et al. 2006; Lee and Pottier 2009), $$p(I_1, I_2) = \frac{n^{n+1}(I_1 I_2)^{\frac{n-1}{2}} \exp\left[\frac{n(I_1/c_{11} + I_2/c_{22})}{1-|\rho_c|^2}\right]}{(c_{11}c_{22})^{\frac{n+1}{2}} \Gamma(n)(1-|\rho_c|^2)|\rho_c|^{n-1}} I_{n-1}\left(2n\sqrt{\frac{I_1 I_2}{c_{11}c_{12}}} \frac{|\rho_c|}{1-|\rho_c|^2}\right), \quad (7)$$

where $\Gamma(\cdot)$ and $I_n(\cdot)$ stand for the Gamma function and modified Bessel function, respectively. Although (7) is used as the starting point of water extraction in this study, the RAPID framework is not restricted to the dual-polarization case, as one can simply replace (7) with other PDFs according to the polarization availability. The distribution parameters of (7) are $$C_{ii} = E\langle |S_i|^2\rangle \quad (8)$$

and $$|\rho_c|^2 = \text{Cov}\langle I_1, I_2\rangle = \frac{E((I_1 - E\langle I_1\rangle)(I_2 - E\langle I_2\rangle))}{\sqrt{E\langle(I_1 - E\langle I_1\rangle)^2\rangle E\langle(I_2 - E\langle I_2\rangle)^2\rangle}}. \quad (9)$$

In this step, we try to find the optimal value of $(C_{11}, C_{22}, |\rho_c|)$ for a given SAR image and then find the best probability density threshold. Unfortunately, due to the nature of SAR calibration, we cannot assume $(C_{11}, C_{22}, |\rho_c|)$ to be constant over either time or space across different scenes of imagery. We developed an iterative optimization procedure for dual-polarized SAR data that shares similar principles with the single-band optimization method proposed by Giustarini et al. (2013).

A single threshold is not applicable in a dual-polarized intensity space. Instead, we use a probability density threshold, $th_{PD}$. A pixel is classified as water if $$p(I_1, I_2) > th_{PD}. \quad (10)$$

In this way, the intensity domain is segmented into two regions: the central part and the marginal part, which correspond to water and non-water, respectively. If accumulative probability, $th_P$, of water pixels needs to be retained, then $$th_P = \iint_{p(I_1, I_2) > th_{PD}} p(I_1, I_2) dI_1 dI_2. \quad (11)$$

Using (11), $th_{PD}$ can be uniquely determined by $th_P$ and PDF. We can then derive our iterative optimization procedure:

1. Compute the initial value of distribution parameters, $(C_{11}, C_{22}, |\rho_c|)$, from sampled water pixels.
2. Set $th_P = 0.82$ as the minimum retaining probability.
3. Solve for $th_{PD}$ using (11).
4. Classify the entire image by substituting $th_{PD}$ into (10). Note that the seeding pixels are unconditionally classified as water to prevent the parameters from deviating due to trimming of the tailing region of the probability domain.
5. Update $(C_{11}, C_{22}, |\rho_c|)$ using all pixels classified as water.
6. If the change of $(C_{11}, C_{22}, |\rho_c|)$ is within 0.1%, the iteration under the current $th_P$ converges; if the change is too large—say, twice the original value—the iteration under the current $th_P$ fails; go to step 9. Otherwise, go to step 3.
7. Save the current $(C_{11}, C_{22}, |\rho_c|)$ and $th_{PD}$ as the converged parameter set and classification threshold for the current $th_P$. Compute the Nash-Sutcliffe efficiency coefficient, $$NSE(th_P) = 1 - \frac{\iint [p(I_1, I_2) - p_{obs}(I_1, I_2)]^2 dI_1 dI_2}{\iint [\overline{p_{obs}}(I_1, I_2) - p_{obs}(I_1, I_2)]^2 dI_1 dI_2}, \quad (12)$$

where p and $p_{obs}$ stand for the probability density computed by (7) and the probability density aggregated from all water pixels in the image, respectively. $p_{obs}$ is derived by a grid area-normalized 2D histogram.

8. Increment $th_P$ by 0.01. If $th_P$ is smaller than the upper limit, 0.99, set $(C_{11}, C_{22}, |\rho_c|)$ to the original value. Then go to step 3.
9. The $th_P$ and $(C_{11}, C_{22}, |\rho_c|)$ corresponding to the maximal NSE are selected as the optimal values.

Automated Sampling and the Determination of ENL

Similar to Lu et al. (2014)'s strategy of detecting "core" flooded areas, we removed the requirement of bimodal histogram by initializing the PDF of water class from seeds needed in step 1. But, as discussed in the introduction, change detection is sensitive to speckle and geolocation error, and the threshold is difficult to globalize, so we chose to use a different approach. For sampling to be completely automated, the generation of seeds for step 1 needs to be automated. We proposed to obtain seeds automatically by collecting pixels of high water probability value (>95%) from the TM-derived global water probability map (Pekel et al. 2016). In this step, the high probability requirement ensures that most sampled pixels are water in SAR images. One potential complication is that we may still sample a very small portion of non-water pixels with strong backscattering. The magnitude of a single pixel of a strong scatterer can be many orders greater than water pixels in a radar image and is thus able to deviate the PDF significantly. Non-water pixels other than strong scatterers can broaden the scattering range, preventing us from deriving reasonable intervals to compute the histogram of the water class. To remove these non-water samples before initializing the PDF, we need to determine a pair of upper and lower thresholds, $I_u$ and $I_d$, for each polarization. The PDF of water pixels of a single polarization follows the $\chi^2$ distribution (Lee and Pottier 2009), $$p\left(\frac{nI}{C_{ii}}\right) = \chi^2_{2n}\left(\frac{nI}{C_{ii}}\right), i = 1, 2 \quad (13)$$

We require $(I_u, I_d)$ to represent a confidence interval of no less than 99% and let $I_p$ stand for the peak density. Then $$\frac{nI_d}{C_{ii}}, \frac{nI_u}{C_{ii}}, \text{ and } \frac{nI_p}{C_{ii}}$$

can be estimated from (13). As $I_p$, can be estimated from the histogram of sampling pixels and n is provided by the user guide the SAR data, even in the presence of strong scatterers and other non-water pixels, $C_{ii}$, $I_d$ and $I_u$ can finally be derived. The following steps outline the method to estimate $I_u$ and $I_d$ and to refine n
1. Find the intensity of the peak density, $I_p$, from the initial samples.
2. Find the $x_u$, $x_d$ whose the cumulative probability of value $\chi_{2n}^2$, are 0.5% and 99.5%, and $x_p$ which yields the peak $\chi_{2n}^2$, value
where n is initialized using values from the Sentinel-1 user guide (https://sentinel.esa.int/web/sentinel/user-guides/sentinel-1-sar/resolutions/level-1-ground-range-detected)—i.e., 4.4 and 29.7 for the interferometric wide swath (IW) and strip map (SM) modes, respectively.
3. Initialize $I_u$ and $I_d$ using (14), $$I_{u,d} = \frac{x_{u,d}}{x_p} I_p \quad (14)$$

4. Iteratively refine $I_u$ by increasing $I_u$ by half a time until the sample number of the excluded tailing region, [$I_u$, $5I_u$], is smaller than 0.5% of the included region, [$I_d$, $I_u$]. Refine $I_d$ similarly.
5. Using remaining samples, refine ENL by (15):

$$n = \frac{\sqrt{E\langle (I - E\langle I\rangle)^2\rangle}}{E\langle I\rangle} \quad (15)$$

Water Mask Generation by Multiple Thresholds

We generated three water masks, $WM_h$, $WM_m$, and $WM_l$, from a single SAR image using multi-level probability density thresholds (high, moderate, and low) and later combined them through morphological and compensation procedures to suppress the severe over- and under-detection of current automated algorithms. The idea was to let $WM_h$ have the optimal PDF, $WM_m$ have a balanced over- and under-detection, and $WM_l$ have a low level of under-detection but a high level of over-detection. The high threshold was the optimal $th_{PD}$. Then we divided $th_{PD}$ by 30 and 300 to get the moderate and low thresholds, respectively.

Step B: Morphological Processing

The objective of the morphological processing is to use body-level rather than pixel-level features to reduce over-detection and prepare for the next compensation step to reduce under-detection. We begin by acknowledging the following facts:
1. Disconnected inundation areas may exist. Therefore, not all water sources are identifiable from "dry date" SAR images and the LCC map.
2. Water-like radar responses from non-water surfaces can exist in any SAR image (pre-flood or in-flood).
3. Geometric error and noise-like speckle may "confuse" a change detector over targets with thin shapes, such as streets and small creeks.

We then design for the RAPID system a robust morphological module consisting of two steps: water source tracing (WST) and improved change detection (ICD).

WST utilizes the RGA to form water bodies from known water sources—that is, pixels that are classified as water on both the LCC map and the radar-derived water mask $WM_h$ (under processing). We then impose a size limit ($th_{size}>50$ pixels) on all water body pixels, and a fraction limit of highly developed classes, developed ratio ($r_{dev}<30\%$) on water body pixels without the permanent water pixels overlapping with the LCC data. The argument is that false detected water bodies consist of speckle and unchanged non-water smooth surfaces.

WST has little chance of introducing over-detection caused by non-water smooth surfaces and blocked areas, but it has a high chance of neglecting water areas charged by narrow water paths invisible to the images' resolution. To identify these overlooked water areas further, we use ICD, but only for in-flood water masks.

We implemented ICD by running RGA again over the remaining water pixels (after muting all water pixels identified by the WST) in $WM_m$(in), using the positive pixels in the difference water mask, $\Delta WM=WM_h$(in)$-WM_m$(pre), as seeds. For derived water bodies, we loosened the developed ratio to $r_{dev}<80\%$ and added two over-detection criteria to $th_{size}$ and $r_{dev}$ used in WST: the inundation ratio ($r_{inund}>30\%$) and high probability ratio ($r_p>50\%$). For each water body, we defined the inundation ratio as the difference area—the number of pixels that are classified as water in $WM_m$(in) but as non-water in $WM_m$(pre)—over the total area and the high probability ratio as the number of water pixels in $WM_h$(in) over that in $WM_m$(in). The reason for running the morphological processing over $WM_m$ rather than $WM_h$ for in-flood images is to reduce under-detection caused by speckle and to facilitate accurate estimation of $r_{inund}$ and $r_p$. Note that speckle and changing shadow areas may severely affect the accuracy of change detection. To overcome them in ICD, we are forced to use, respectively, at least four dry references and satellite data of the same track (mode and orbit number). With identified water pixels (actual water or water-like) on multiple pre-flood dates forming the maximal pre-flood water mask, the probability of misidentifying seeding pixels and overestimating inundation ratio is reduced significantly. Since pre- and in-flood SAR data obtained in the same track share the same illumination geometry at any given pixel, they share similar water-like surfaces as well.

The ICD is different from traditional change detection (Giustarini et al. 2013; Lu et al. 2014; Matgen et al. 2011) in three ways: (1) ICD runs over all remaining non-water pixels after WST. It does not require inundated pixels to be connected to a known water source and, therefore, is capable of detecting inundation of disconnected lowland. (2) Complete water bodies rather than just changed pixels are formed by running RGA in ICD, while changed pixels, $\Delta WM$, only serve as seeding pixels. Therefore, $r_{inund}$ and $r_p$ can be calculated at object level. Consequently, whereas traditional change detection algorithms measure whether the backscattering of a pixel is significantly changed, ICD measures whether a water body's area is changed significantly to evaluate its inundation severity. And (3) ICD detects changed pixels from a binary water mask instead of from an image of SAR backscattering. In practice, $r_{inund}$ and $r_p$ were effective to avoid introducing blocked (shadow) areas. The joint use of all four criteria at object level—that is, a water body must satisfy all the criteria to be accepted—made ICD resistant to classification error, noise-like speckle, and geometric error of SAR data. Although the threshold values of the four criteria are empirical, they all have clear physical interpretations, and users do not need to adjust them to different events and regions.

WST and ICD each overcomes the drawbacks of the other: the under-detection of inundation areas with unidentifiable water sources by WST and the exclusion of river-extended flood plains (usually of low $r_{inund}$ values) by ICD. Overall, the sophisticated morphological processing makes RAPID robust to common errors of ancillary and SAR data.

Step C: Compensation

Through morphological processing, most over-detection is removed and the location of all water bodies is determined. The under-detection within and surrounding water bodies is dealt with through compensation, as detailed in the following:
1. Generate a buffer region (extending 15 pixels) by swelling from the morphologically processed water mask.
2. Label a buffered pixel as water if it is identified as water in the $WM_l$ to generate $WM_{comp}$.
3. Using all water pixels identified before step 2 as seeds, apply the RGA to $WM_{comp}$. The grown water pixels form the final water mask.

The buffered area contains outside pixels to a certain distance and most inside pixels. Misclassified non-water pixels inside of each water body are a result of speckle; equivalently, pixels distributed in the marginal area of the water PDF, lower down the threshold of probability density, will reduce the error inside of each water body while not significantly altering the true boundary, as shown in FIGS. 5d and 5e.

Step D: Machine Learning-Based Correction

Errors caused by noise-like speckle and strong scatters can occur inside of water bodies in $WM_{comp}$. Although filtering approaches dominate SAR processing, they sacrifice the effective resolution and change the statistics of the signal without completely eliminating the error. For this reason, we did not employ a local filter in RAPID. Instead, we constructed an automated correction step based on machine learning. This step assumes that (1) given the noise, the majority of pixels are correctly classified; and (2) high-resolution terrain, river bathymetric, and network data also can provide the possibility ranks of water pixels.

In this correction step, a logistic binary classifier (LBC) is trained to predict the water probability of pixels in all water bodies and their buffered areas. Water coverage-related features are extracted as input variables, and the water result from the compensation step (described above) is used as a "prediction result" to train the LBC. Finally, user-defined thresholds are applied to the predicted water probability to correct the water mask. Unlike in usual machine-learning procedures, the pixels for training and correction in RAPID are in the same set, and neither cross-validation nor optimization is needed in the training.

Figure 4:
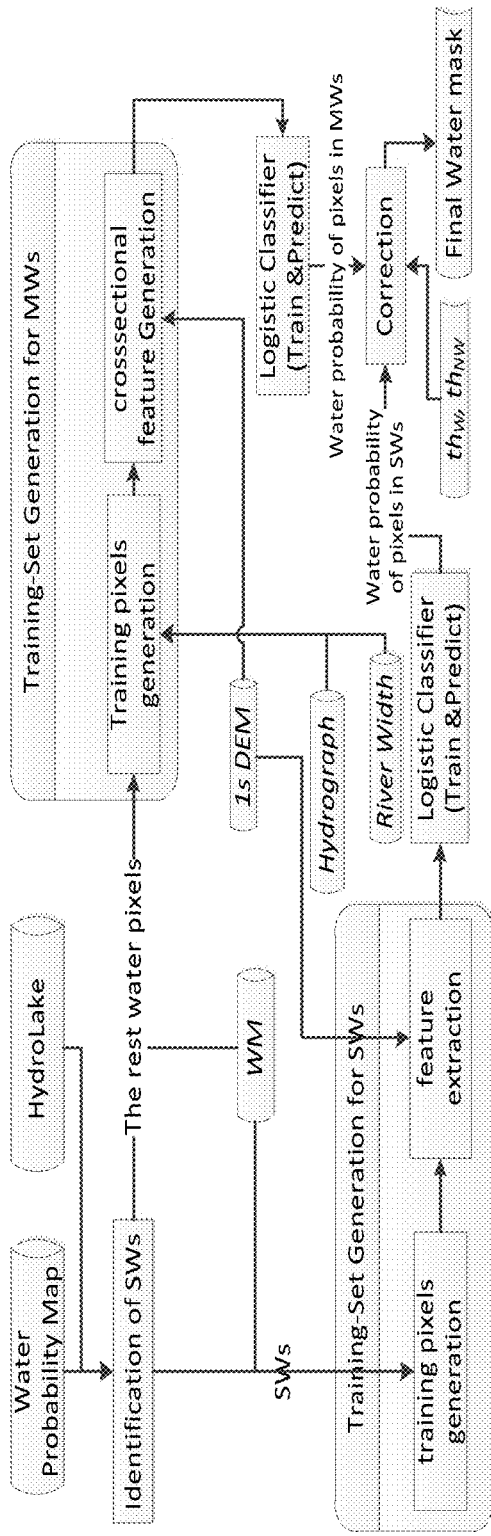
FIG. 4 schematically illustrates machine-learning correction schema.

The correction algorithm is depicted in FIG. 4. The reasons whether a pixel can be water within these two categories of water bodies—standing water bodies (SWs, hereafter referred to as lakes, wetlands, ponds, and reservoirs) and water bodies in movement (MWs)—differ between the categories. For SWs, a pixel is in water because its elevation is lower than the overland area. Elevation dominates the water coverage with the regulation of gates for some reservoirs. For MWs, elevation is only balanced within a cross section. The overland elevation of a downstream segment, for example, can be lower than the in-channel elevation of an upstream segment within a single river body.

Consequently, factors that contribute to the expansion of river bodies are more complex than those affecting SWs, so in constructing the correction step we needed to separate the two categories and construct different feature spaces for them.

Unfortunately, no existing algorithm can accurately separate standing and flowing water bodies because manmade standing water bodies, such as reservoirs and canals, can be made in a wide variety of shapes or within any part of the fluvial system. Instead of developing an automatic algorithm, we relied mostly on existing datasets based on survey or visual interpretation. For the identification of SWs, we jointly used the HydroLakes dataset (Messager et al. 2016), US detailed water bodies (USDWB, optional, provided by ESRI), and water probability. HydroLakes is mostly accurate for SWs larger than 10 ha, USDWB labels a lake/pond or stream to each segment of the water central line. The two datasets may help identify more than 90% of water bodies, with those remaining unidentifiedsmall SWs. We used a simple rule to identify the remaining SWs—that is, a small water body is an SW if its $P_{50}$ (water probability that ranks at 50 percentile) and compactness (the square root of area over the perimeter) are greater than 45% and 25, respectively. Improving the classification of SW and MW is beyond the scope of this study, but deep learning methods may be applied for this purpose in the future.

Training Samples

To train the classifier, buffering regions were generated from existing water bodies so both true (water) and false (non-water) pixels would be included. For an LB, we simply swelled the water area by 15 pixels. For river cross sections, we connected a given number (3 to 5) of adjacent central channel pixels, then generated a buffered polygon using twice their maximal river width. Therefore, a river width dataset was needed. Since we lacked this information, water pixels not contained in the training set of SWs or river bodies would not be processed (trained, predicted, or corrected).

Feature Selection

A water unit is a group of water pixels that theoretically share the same limit of a given feature. For an SW, the entire water body is a water unit, whereas for an MW, each cross section is an individual water unit. Table 1 provides the feature spaces of SWs and river cross sections (RCs). Each pixel has two types of features: uniform, which are constant for all pixels belonging to a water unit, and distributed, which are different for each pixel. Within a water unit, for example, the elevation of all pixels (a distributed feature) should be smaller than the maximal elevation (a uniform feature) of the water unit.

TABLE 1

Feature space of water bodies

| Feature Description | Reason to Select | Water Type | Feature Type |
| --- | --- | --- | --- |
| Central channel pixel (CCP) FAC | River width is related to drainage area. | RC | Uniform |
| Maximum distances from both sides to CCP | Greater distance indicates smaller chance of being inundated. | RC | Uniform |
| Distance from CCP | | RC | Distributed |
| Maximal elevation difference to the lowest pixel | Elevation difference should be below the upper limit. | Both | Uniform |
| Elevation difference ranked at 99%, 97%, 95%, and 90% | | SW | Uniform |
| Elevation difference to the lowest pixel | | Both | Distributed |
| Elevation ratio to the highest pixel | | RC | Distributed |
| Minimal probability | Probability is higher for river and SW centers than for edges (works better for drier situations). | Both | Uniform |
| Probability ranking at 1%, 2%, 5%, 10%, and 20% | | SW | Uniform |
| Probability | | Both | Distributed |

Ideally, the minimal probability and maximal elevation of an SW set the limits for all pixels within the SW. Due to the relatively coarse resolution and low frequency (15 days) of Landsat images, however, using minimal (0% rank) probability as the lower limit may result in a non-informative zero value of this feature for many SWs. We added, therefore, 1-20% rank probability values. Similarly, since the elevation of an SW can be controlled by a gate, the maximal elevation difference may not be representative of the floodplain boundary. We included, therefore, 90-99% elevation differences, as well. For a river water unit, we simply used the minimal probability or maximal elevation difference, due to the limited number of pixels within each cross section. As coastal areas have less pronounced topography per stream cross section than most inland areas, we included an elevation ratio as a supplement to elevation difference.

Correction Thresholds

Typically, a single threshold is applied to the probability result to generate the binary classes. To prevent over-correction and not rely purely on the trained results, we used double thresholds, 0.1 and 0.8. A water probability lower than 0.1 or higher than 0.8 indicated that a given pixel should be labeled as non-water or water class, respectively. Otherwise, if the probability falls in between, the class of the pixel will not change.

EXAMPLES

Two flood events were selected to test the efficiency and robustness of RAPID. Typhoon Nepartak caused flooding of the Yangtze River in 2016, and Hurricane Harvey caused flooding in Texas in 2017. The two events were large enough to be observed by satellite multiple times. Moreover, they occurred outside of and within the United States, respectively, thus allowing us to test the robustness of RAPID using different input data, in different locations and climatic conditions. Table 2 describes the events and data.

TABLE 2

Data and test events

| Event | Location | Data availability of pre-flood dates | Data availability of in-flood dates |
| --- | --- | --- | --- |
| Nepartak | Hubei, China | May 6, 18, 23, and 30, 2016 | Jul. 5, 17, and 22, 2016 |
| Harvey | Texas, USA | Jun. 25, Jul. 18, 24, 30, and 31, and Aug. 05, 11, 12, 18, and 23, 2017 | Aug. 29 and 30, and Sep. 4, 5, and 10, 2017 |

We acquired Sentinel-1 level-1 dual-polarized (VH+VV or HV+HH) SAR data for Nepartak in IW mode and for Harvey in IW and SM modes in Ground Range Detected (GRD) format. After pre-processing using Sentinel Application Platform (SNAP), the ESA-released toolbox, the resulting pixel spacing was 10×10 m. The pre-processing included four steps:

1) Orbit correction
2) Radiometric calibration
3) Range-Doppler geometric terrain correction
4) Incidence angle normalization Steps 2 and 3 are sometimes referred to as radiometric terrain correction (RTC). For simplicity, we used the algorithm provided by Mladenova et al. (2013) to run step 4. The total processing times for IW mode (~33,000×21,000 pixels) images are around 6 h and 1 h for in- and pre-flood images, respectively. For the SM mode (~12,000×17,000 pixels), processing takes around 2 h and 30 min. We processed images of the events on the University of Connecticut's high-performance computer (HPC) in parallel, making the total processing time about 6 hours. We used Matlab and Microsoft R Enterprise (RRE) to implement, respectively, the Steps A-C and the machine learning step.

Table 3 provides ancillary data options. Categorized by type, they comprise LCC, water occurrence, hydrographic, water type, and river width products. Of the Landsat-based LCC products, the National Land Cover Database (NLCD) (Fry et al. 2011; Homer et al. 2007; Homer et al. 2015; Vogelmann et al. 2001) is available in the United States at five-year intervals, and the Finer Resolution Observation and Monitoring of Global Land Cover database (FROM-GLC) (Gong et al. 2013) (http://data.ess.tsinghua.edu.cn/) has been available all over the globe since 2010. In NLCD taxonomy, water types are coded 90, "water bodies," and 95, "wetland," while highly developed types are coded 23, "built-up area with medium density," and 24, "built-up area with high density." In FROM-GLC taxonomy, water types are 50, "wetland," and 60, "water bodies," while the highly developed type is 80, "artificial surfaces." For water occurrence, the only available dataset is produced by Pekel et al. (2016). For river width, two products, the Global River Width (GRWidth) (Allen and Pavelsky 2018) and the Global Width Database for Large Rivers (GRD-LR) (Yamazaki et al. 2014) are available. The latter will be available in the future for global applications. For hydrography, the National Hydrograph Dataset (NHD) plus v2 (Simley and Carswell Jr 2009) (www.horizon-systems.com/NHDPlus/NHDPlusV2_home.php) is available at 30 m resolution in the United States and the global GRD-LR at 90 m resolution globally. We used GRWidth as river width for both the Nepartak and Harvey events; as LCC we used FROM-GLC for Nepartak and NLCD for Harvey; and as hydrography we used GRD-LR for Nepartak and NHD for Harvey.

TABLE 3

Input data to the RAPID kernel algorithm

| Name | Source/Type | Producer | Time Span | Coverage | Spatial Res. | Revisiting Intervals | Needed by Step |
| --- | --- | --- | --- | --- | --- | --- | --- |
| Sentinel-1 | SAR | ESA | Since 2014 | Global | 3.5/10 m | ~2 days | A |
| NLCD | TM/LCC | USGS | 1992-2011 | US | 30 m | 5 years | B |
| FROM-GLC | TM/LCC | Tsinghua Univ. | 2010 only | Global | 30 m | One time | B |
| Water Occurrence | TM/water probability | ESA | 1984-2015 | Global | 30 m | Static | A & D |
| Hydrography | NHD | Horizon Systems Co. | N/A | US | 30 m | Static | D |

TABLE 3-continued

Input data to the RAPID kernel algorithm

| Name | Source/Type | Producer | Time Span | Coverage | Spatial Res. | Revisiting Intervals | Needed by Step |
|---|---|---|---|---|---|---|---|
| DEM | STRM | USGS | N/A | Global | 30 m | Static | D |
| GRWidth | TM/River Width | George Allen | N/A | Global | 30 m | Static | D |
| GWD-LR | STRM/River Width and Hydrography | Dai Yamazaki | N/A | Global | 90 m | Static | D |
| HydroLakes | STRM | WWF | N/A | Global | 90 m | Static | D |
| USDWB | multiple | Esri, USGS, and USEPA | 2018 | US | 4 m | Static | D |

Figure 5:
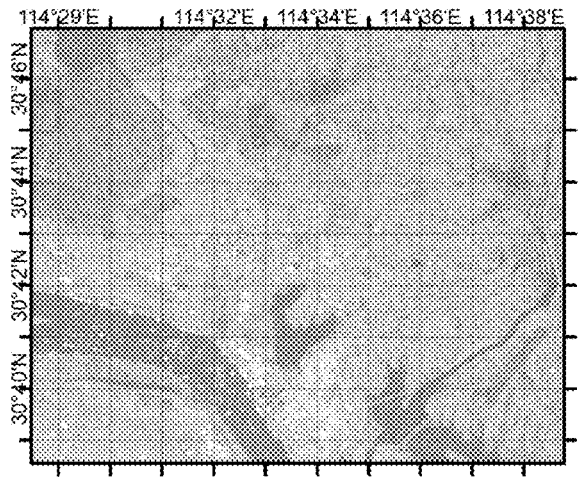
FIG. 5 illustrates the major processing steps of the system using the water mask during the flooding of Yangtze River, Jul. 17, 2016. (a) SAR data of Jul. 17, 2016 (b) ESRI map, (c) water mask, $WM_h$, derived from the binary classification using the optimal threshold, step A (d) water mask from step B, morphological processing, (e) water mask from step C, compensation, and (f) final water mask from step D, machine-learning correction.
Figure 5:
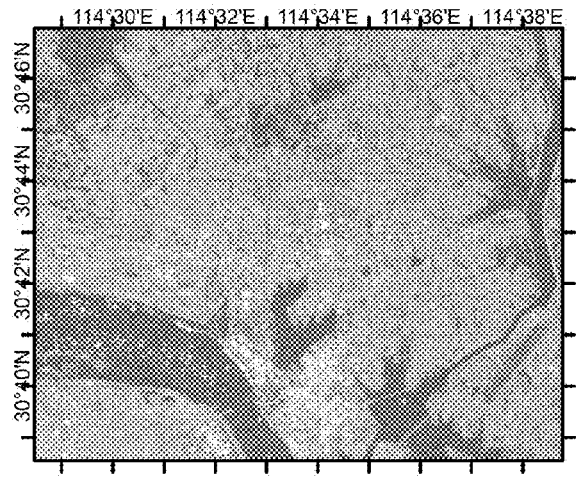
Figure 5:
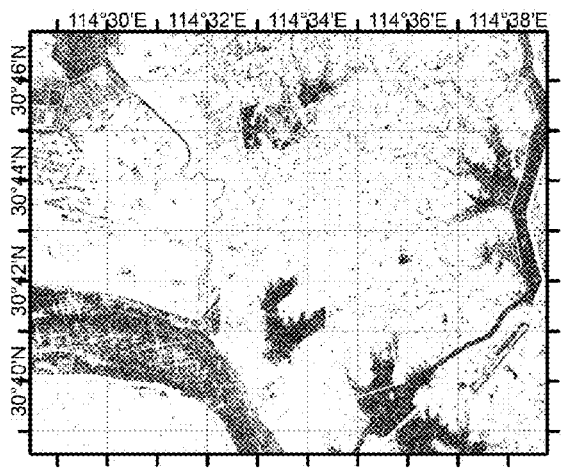
Figure 5:
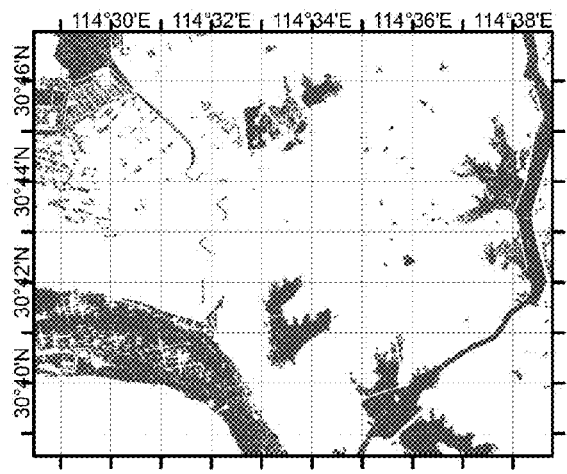
Figure 5:
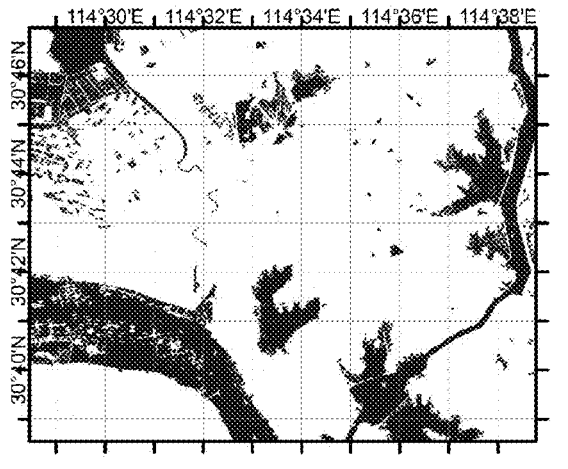
Figure 5:
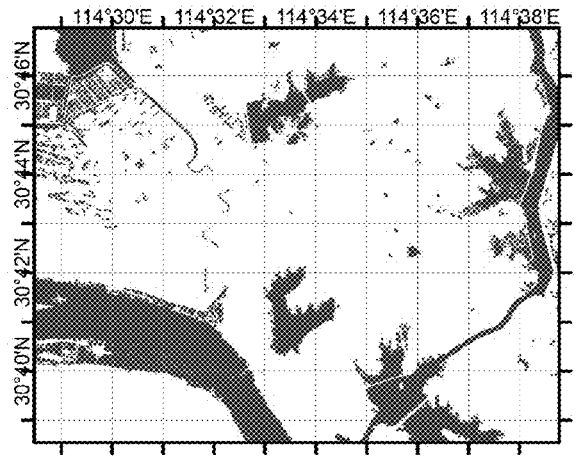

FIG. 5 shows the concept for processing steps for the SAR image obtained for the Jul. 17, 2016 event, over a zoomed-in area containing combined water-like surfaces (roads and an airport) and inundated areas. FIG. 5c provides an example area affected significantly by noise-like speckle and strong scatterers, as identified through binary classification. As shown, it is difficult to delineate the boundary of floodplain or flooded fields due to the antenna synthesis and range compression, strong scatterers for the Yangtze River, infrastructure, and vehicles radiating strong backscattering to surrounding areas along the azimuth and range directions (the cross-shaped underestimated areas). Over-detection is observed over the airport in the bottom right corner of FIG. 6c, with speckle over most overland areas. The morphological processing eliminated most over-detection and slightly reduced under-detection, as shown in FIG. 5d. The compensation steps further reduced the under-detection caused by the PDF overlapping between water and non-water classes, as shown in FIG. 5e. The remaining issue—under-detection caused by strong scatterers and speckle—was corrected by the machine learning-based method, as shown in FIG. 5f.

The chance of having synchronized optical and SAR data of comparable resolution for the same area is rare, especially during a given flood period. To carry out quantitative validation, we compared the RAPID-generated inundation result with an expert, hand-derived inundation delineation (referred to as EE hereafter), intuitively using Sentinel-1 and World-View data. FIGS. 5a and 5b show strong agreement between RAPID and EE. The confusion matrix, M, between RAPID and EE is given by Table 4.

TABLE 4

Confusion matrix of inundation mapping

| Confusion matrix | | EE | |
|---|---|---|---|
| | | Wet | Dry |
| Retrieval | Wet | 12,992,348 (11.09%) | 3,853,426 (3.29%) |
| | Dry | 4,367,647 (3.73%) | 95,979,615 (81.90%) |

Figure 6:
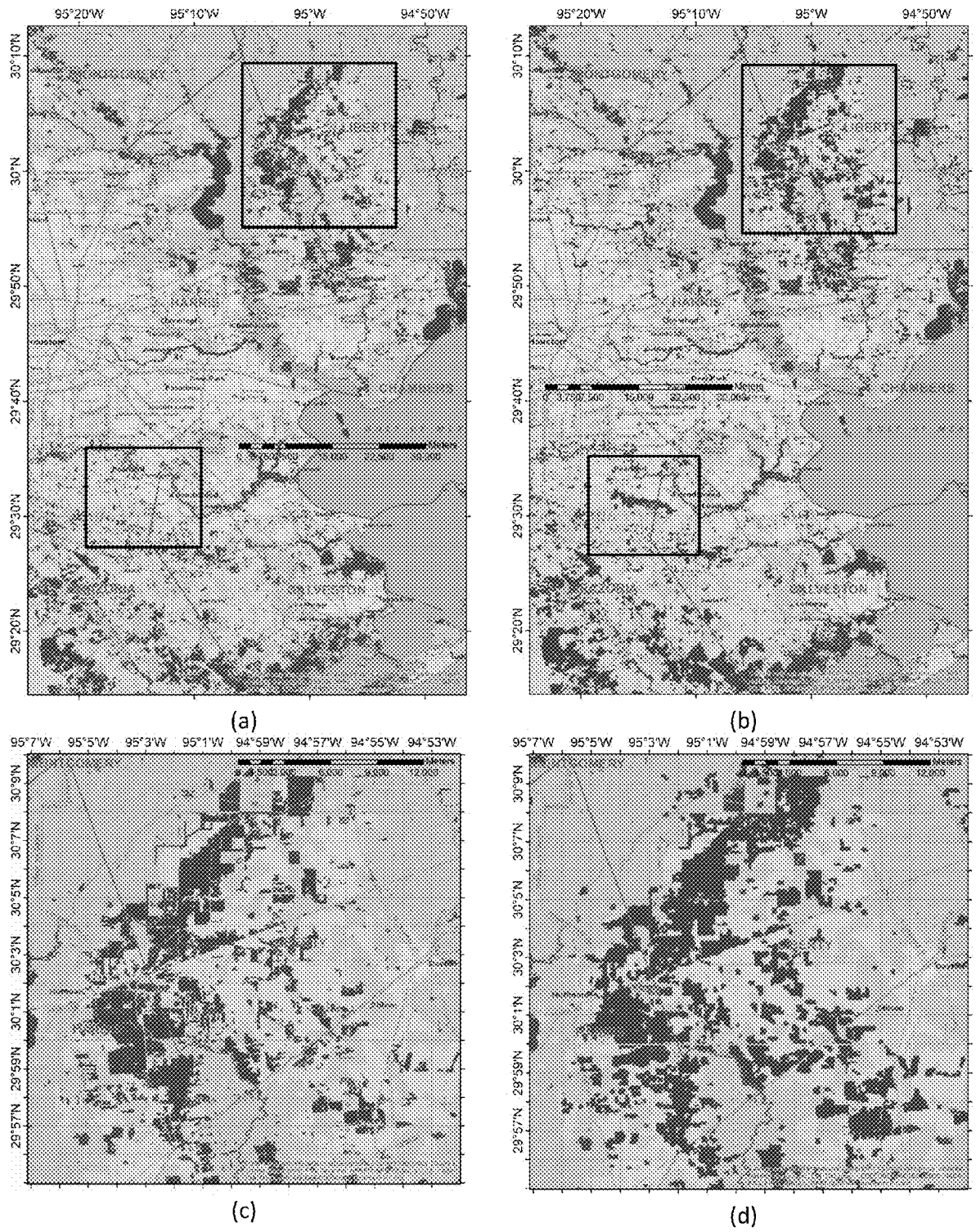
FIG. 6 is a comparison of RAPID inundation map (a), (c), and (e) with EE (b), (d), and (f). (g) and (h) are pre- and in-flood Sentinel-1 data collocated with (e) and (f).
Figure 6:
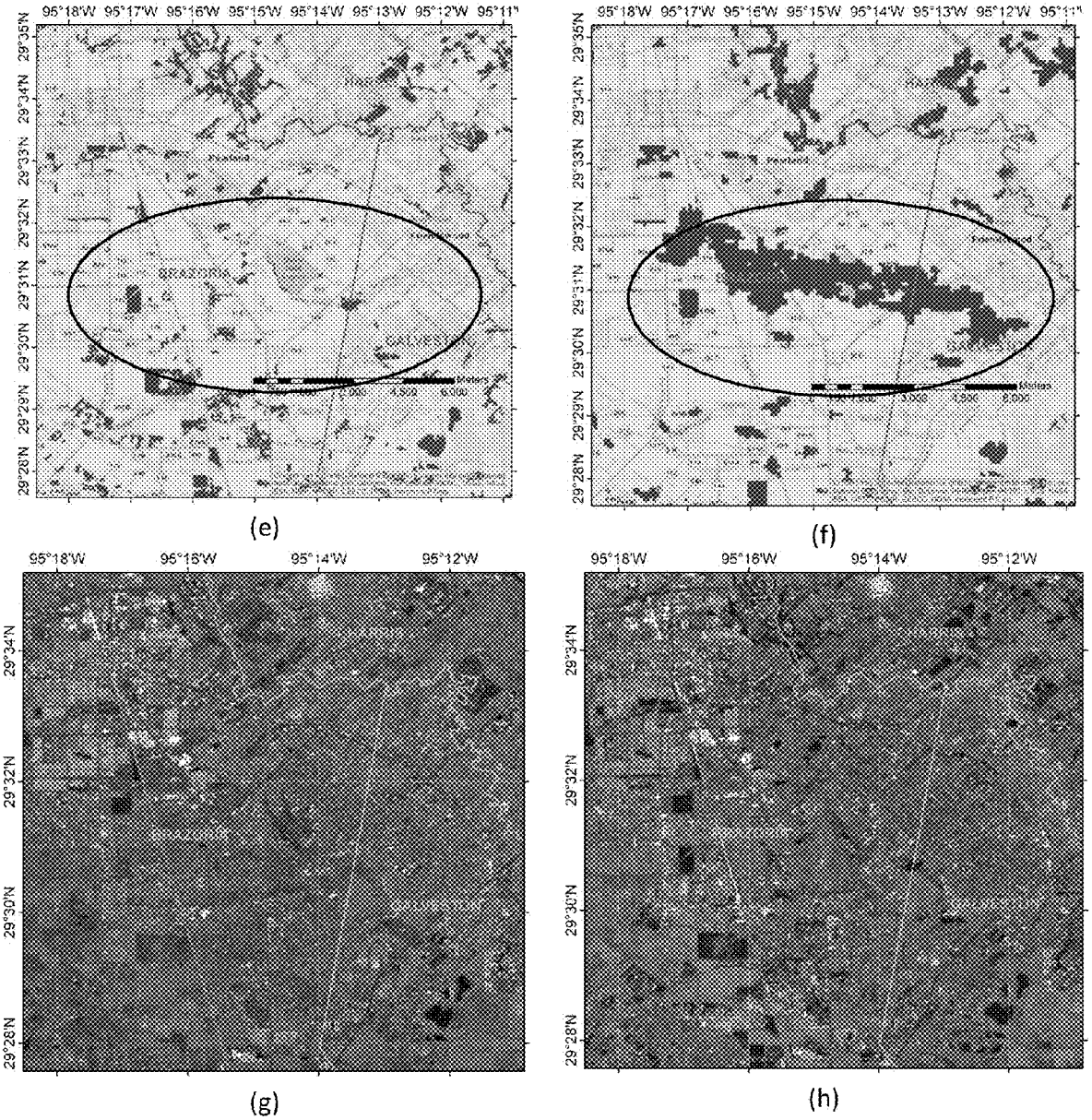

It shows overall agreement, with $M_{11}+M_{22}$ being 93% pixels, with producer accuracy, $M_{11}/(M_{11}+M_{21})$, being 77%, and user accuracy, $M_{11}/(M_{11}+M_{12})$, being 75%, respectively. Although the EE map is the best obtainable reference, RAPID did not necessarily produce false positives or negatives among pixels that disagreed. The major portion of "under-detection" by RAPID, for example, is given by FIGS. 6e and 6f. By comparing the pre-flood and in-flood SAR data in FIGS. 6g and 6h, we concluded the circled part of FIG. 6f was not, in fact, flooded. Indeed, the EE map was generated by compiling inundation results from other SAR images and from performing Dartmouth Flood Observatory (DFO; http://floodobservatory.colorado.edu) in-house classification algorithms on optical data, to deliver comprehensiveness overall flooding during a prolonged event. In this case, SAR images from more than one satellite were used. The "flooded" area in the circle originated from the result published by Copernicus Emergent Management Service using Cosmos SkyMed SAR data. Since the data acquisition time were different, the inundated area in the EE map might have been caused by fast-vanished or generated inundation that was "observed" by Cosmos SkyMed but not by Sentinel-1. Moreover, FIG. 6c shows more detailed dry terrace than FIG. 6d because, in the generation of EE, filtering and the manually editings of the polygons inevitably sacrificed some details.

Figure 7:
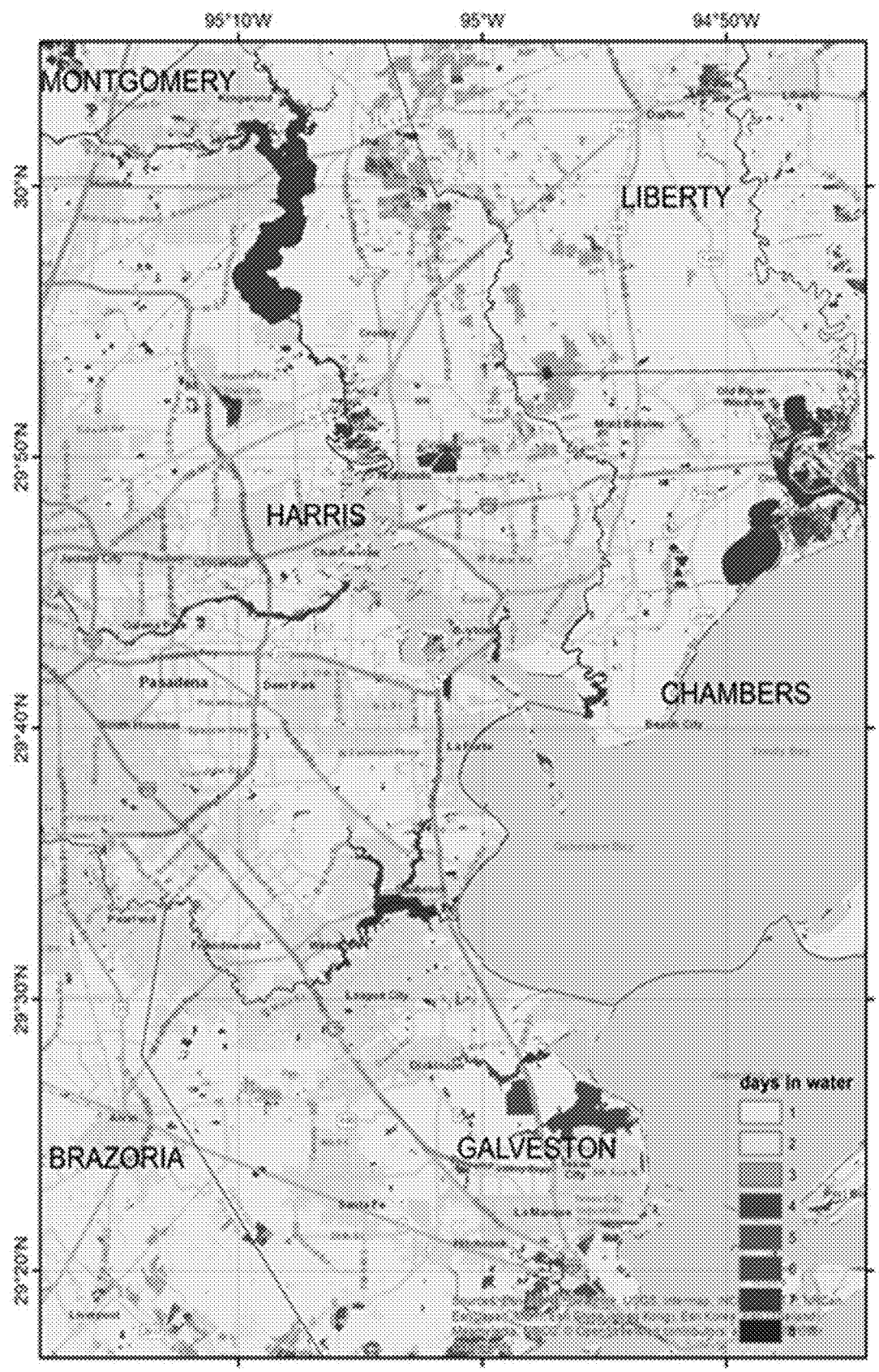
FIG. 7 illustrates the observed times of inundated areas during Sentinel-1 revisits. Data from both Sentinel 1A and Sentinel 1B satellites are available for some of the dates from different orbits.

FIG. 7 shows a map of the times an area is inundated in a region that is within all Sentinel-1 revisits. The fact that permanent water bodies exhibit the greatest number of wetted times verifies the correctness of RAPID procedure.

Figure 8:
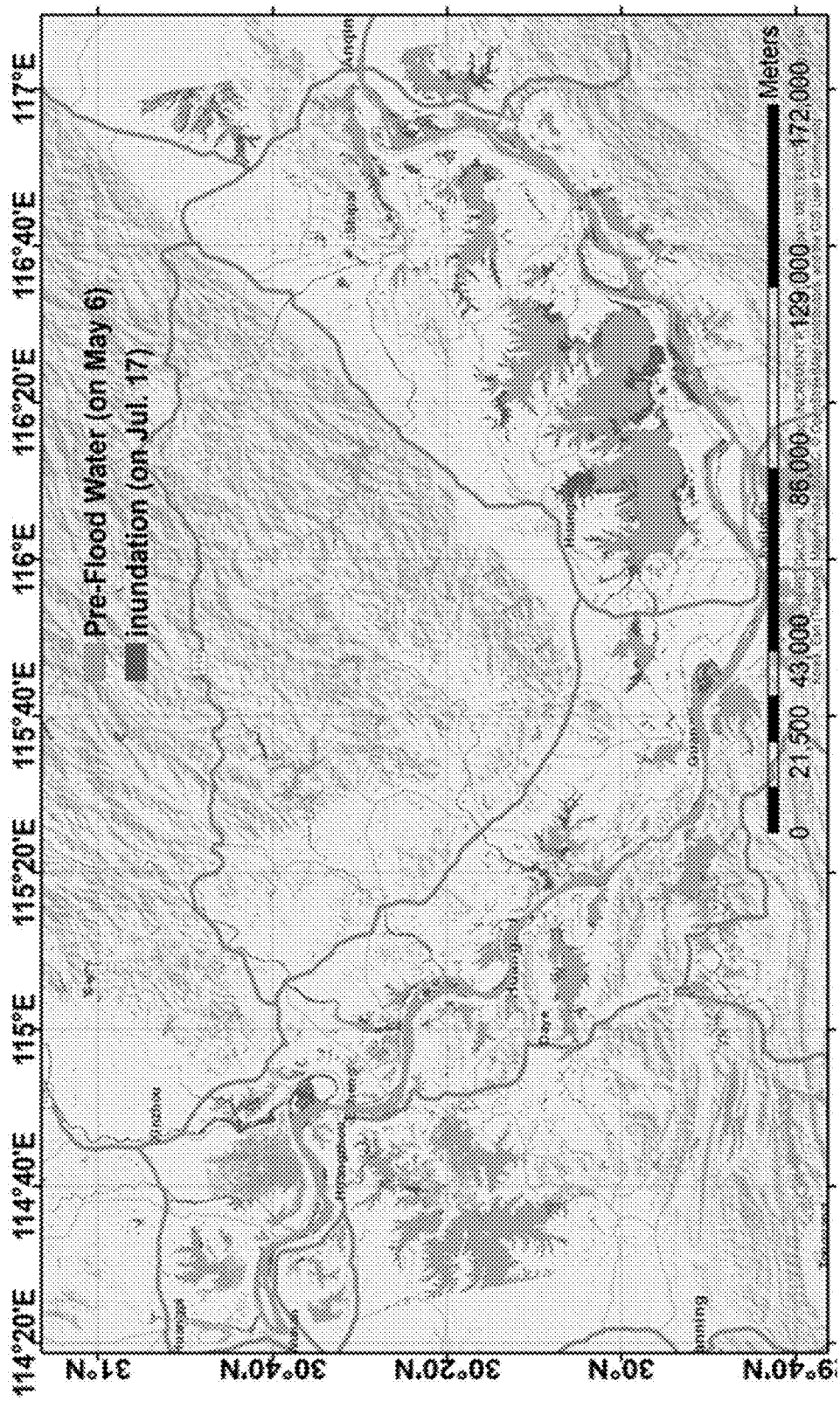
FIG. 8 illustrates inundation detection of a segment of the Yangtze River (centered at Poyang Lake) using Jul. 17, 2016 (b, e, in-flood) vs. May 6, 2016 (e, f, pre-flood). (a) is the overview with circular denoting the misidentification from pre-existing water bifurcation to inundated, and (d) and (g) are the zoomed-in inundation maps.
Figure 8:
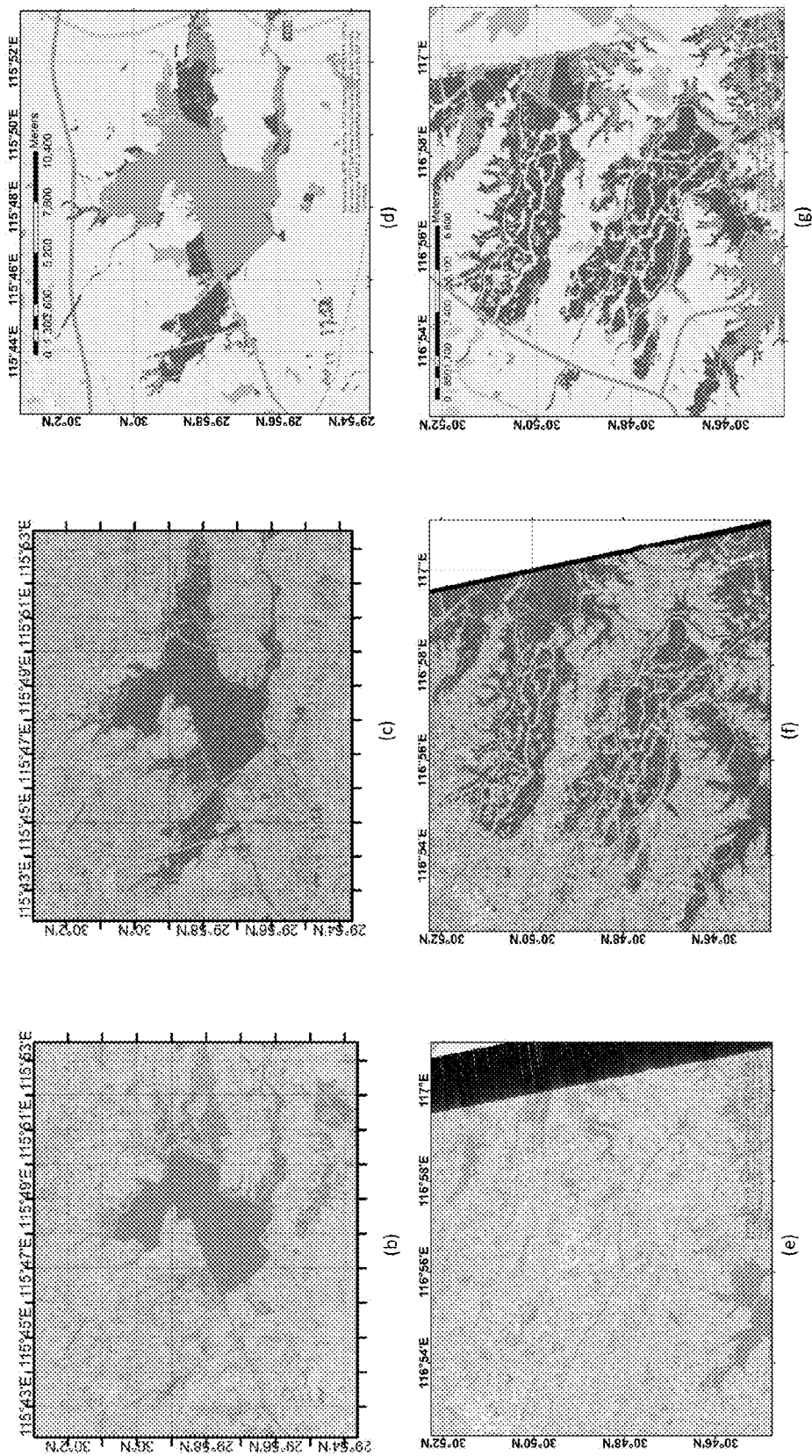

For Typhoon Nepartak, RAPID results generated from SAR data on Jul. 17, 2016 are given by FIG. 8. Although no reference data were available for this event, we provided in the first and second column the pre (on May 6)—and in-flood SAR data for visual validation. FIGS. 8d and 8g show that RAPID accurately captured the inundated area, and that false positives and noise were reduced without sacrificing, respectively, detectability or resolution. Where the LCC map was wrong, pre-existing water pixels derived from SAR data could, infrequently, either be misidentified as inundated if they were connected to a floodplain (as shown in the circular area in FIG. 8a) or as non-water if they were not connected. In practice, both misidentifications will be eliminated in the final result because pre-existing water areas can be accurately created by overlaying water masks extracted by revisits of high-resolution optical remote-sensing satellites (such as Landsat or World View).

We have developed an NRT inundation mapping system, named RAPID, driven by SAR data of dual polarization, which requires no human interference. By combining statistical classification, morphological processing, multi-threshold compensation, and machine learning-based correction, RAPID extracts at high spatial resolution (~10 m) inundated areas that have been flooded from existing water bodies and isolated lowlands and reduces over- and under-detection and speckle noise without applying any filtering techniques, which cause severe problems using existing algorithms. By combining the strength of state-of-art technologies, such as radar polarimetry and machine learning, with information from multi-source remote-sensing datasets and products at high resolution (≥30 m), including LCC, water probability, terrain data, and river bathymetry, RAPID achieved full automation and accuracy, as validated by selected flood events in Hubei, China, and Texas, United States, caused by Typhoon Nepartak (2016) and Hurricane Harvey (2017), respectively.

The datasets we used are all freely available globally. RAPID is configured to be resistant to low-level source data error, such as misclassification and low updating frequency of LCC data, less-representative water probability (of flood extremity), and limited resolution of terrain data. In addition, RAPID is open to integrating newly emerging datasets and products to produce more accurate inundation results. Overall, the RAPID system processing time is similar to that of regular SAR processing techniques to detect water and is of low cost and high quality in both effective resolution and accuracy.

Recently, the abundance of free available SAR data has boosted the ability of the flood-monitoring community to detect inundated areas accurately, often during events. High-resolution inundation maps can be produced without any budgetary concerns regarding, for example, airborne photography missions, as data are freely available from satellites. The RAPID system liberates flood observers from tedious processing work requiring expertise that might not be available during an event. The system can be operationally applied to derive global inundation mapping at intervals of two days (in midlatitude regions) to four days (near the equator) using satellites—both existing and to be launched—equipped with high-resolution SAR sensors, such as Sentinel, the Advanced Land Observation Satellite (ALOS), the Surface Water and Ocean Topography (SWOT) satellite, and the NASA-ISRO SAR Satellite Mission (NISAR).

Besides the advantages of NRT monitoring, the low cost of manpower associated with RAPID facilitates the use of miscellaneous applications, including retrospective investing historical flood events stored in inventory like Shen et al. (2017b) and the DFO using archived SAR data, and the evaluating accuracy of Federal Emergency Management Agency (FEMA) flood-zone maps. With global or regional flood inundation databases populated in the future, the use of RAPID will also benefit the calibration and validation of hydrological, hydrodynamic modeling (Bates et al. 1997; Havnø et al. 1995; Schumann et al. 2005; Shen and Anagnostou 2017; Yamazaki et al. 2011) and studies of inundation risk caused by geomorphological factors (Shen et al. 2017a; Shen et al. 2016). Besides inundation extent, floodwater depth can be inferred with available high-resolution DEM (Cohen et al. 2017).

Synthetic Aperture Radar (SAR) Imagery

The recently emergent freely available satellite-based SAR imagery providing a reasonable spatiotemporal resolution (10 m, ~6 days) and is not disturbed by cloud cover (Prigent et al. 2016; Aires et al. 2017). Consequently, SAR imagery has gained popularity in delineating flood events. However, due to the algorithm complexity and the requirement of expert manual editing, existing flood archives only respond to emergencies (EC JRC 2015; JPL 2017) or a few major cases (Zeng et al. 2019; Diego et al. 2020). No method has yet facilitated a national-scale inundation extent dataset. This is primarily because fully automated retrieval algorithms with acceptable accuracy have only been recently developed (Shen et al. 2019a), which has limited the use of these data in flood events.

An unprecedented 10 m resolution flood inundation archive over the contiguous United States (CONUS) was generated from the entire Sentinel-1 SAR archive for the period from January 2016 to the present, based on the Radar Produced Inundation Diary (RAPID) algorithm (Shen et al. 2019b). By combining radar statistics and machine-learning methods, with the integration of multisource remote sensing data and product, RAPID achieves full automation and high-level accuracy with zero manual post-processing or expert knowledge. The RAPID system is driven by Sentinel-1 SAR imagery provided by the European Space Agency (ESA), which are the only freely available satellite SAR data with global coverage. By applying an automatic processing chain, the method could be further applied to more sources of SAR data, such as the soon to be launched Surface Water and Ocean Topography (SWOT) and NASA-ISRO SAR (NISAR), which is expected to deliver the next generation of global high quality surface water data (Frasson et al. 2019a; NASA 2019). Ancillary data include water surface occurrence, land cover classification, hydrography, and river width, as detailed in the RAPID kernel algorithm (Shen et al. 2019b). The accuracy of the dataset is assessed by visual and quantitative comparison with National Oceanic and Atmospheric Administration (NOAA) event reports, the Federal Emergency Management Agency (FEMA) derived floodplain maps, and the water extent from the USGS Dynamic Surface Water Extent (DSWE) product. The final product includes flood extent in raster format and the associated event table. The proposed dataset can, therefore, facilitate various applications, including flood monitoring, inundation models calibration and verification (Afshari et al. 2018; Zeng et al. 2020), flood damage and risk assessment (Wing et al. 2017), and mitigation management (Wing et al. 2020).

To enable the big data processing at the national scale, the flood trigger system 102 relies on both in-situ stream stage observations and satellite precipitation estimation to initially identify potential flooded zone (PFZ) (the maximal extent that may contain flood inundation) within which we acquire and process overpassing SAR images. The flood trigger system 102 detects two types of flooding, fluvial and pluvial, as depicted by FIG. 1. For the fluvial flooding, it applies the National Weather Service (NWS) flood stage threshold to U.S. Geological Survey (USGS) stream stage measurements to identify the daily flood status (flooded or unflooded) at around 4,455 stations. By subtracting the drainage areas draining to unflooded upstream stations from the flooded area pouring to a downstream station of flood status, the fluvial trigger confines the PFZ to the sub-watershed level. The drainage area for a given outlet is delineated by running the watershed algorithm (Tarboton 1989; Tarboton 1997) over the flow direction map at 30 arc-second resolution contained in the Hydrological Data and Maps based on Shuttle Elevation Derivatives at Multiple Scales (Lehner 2013). The flood trigger system 102 locates pluvial PFZ by applying a threshold to the maximal daily accumulated precipitation within a three-day window, a possible delay between precipitation and runoff. A 60 mm/day was selected as the threshold according to the lower bound of moderate rainfall intensity (OFCM. 2019) to the IMERG (Huffman, et al. 2014), a precipitation field of 0.1° horizontal resolution. Finally, the two types of PFZs are combined to form the daily PFZ.

Based on the spatial proximity and temporal continuity of the daily PFZ, a flood event is defined as follows:
1) Merge two spatially disconnected PFZs into one if a pair of points exist in the two PFZs that their distance is equal to or less than 50 km.

2) For two PFZs on a day and the next, we associate them to the same event if the fraction of the intersected area is no less than 70% of the PFZ on either day.
3) Update the maximal flood extent by the uniting of all PFZs within the latest five-days.
4) Terminate the event if the flood zone is less than 10% of the previous five-day maximal flood extent.

Within a given flood zone, we acquire for retrieval processing the SAR images sensed on the day of flooding and, as dry references, multiple images obtained from the same Sentinel-1 ground track with a certain overlapping, sensed on previous dry days. Approximately five dry references are required by the RAPID kernel algorithm for each SAR image acquired on the flood day to reduce the error caused by noise-like speckle. Level-1 dual-polarized (VH+VV or HV+HH) Sentinel-1 SAR images in IW and SM modes and Ground Range Detected (GRD) format are pre-processed via orbit correction, radiometric correction, and terrain correction using the Sentinel Application Platform (SNAP) and then normalized by the incidence angle using the cosine-law (Mladenova et al. 2013).

The pre-processed grid resolution is regularized to 10 m×10 m when inputting to the RAPID kernel algorithm for flood map delineation. The resulting inundation extent raster images are binary water masks, with pixels labeled as water or non-water. Persistent water bodies are delineated as the maximal water extent of the water masks on dry days. A user can, therefore, choose either to highlight only the inundating area or use the total obtained water area.

The final product contains two sub-datasets. The first sub-dataset is a flood event collection stored as multiple time series in an ESRI shapefile. Each series represents one event containing several days of multi-polygon features with each representing the PFZ of a day. Each multi-polygon feature contains a unique event ID, and the date as fields. The second sub-dataset contains binary flood extent raster files with each pixel labeled as 1 (flooded) or 0 (non-flooded). A separate list is generated to associate the raster file name of each flood extent to the event ID to facilitate event-wise queries. The archive is linked to the Global Active Archive of Large Flood Events database produced by the Dartmouth Flood Observatory (DFO) (Brakenridge et al. 2010; Adhikari et al. 2010) to extend the flood death and displaced estimates caused by related events.

Figure 9:
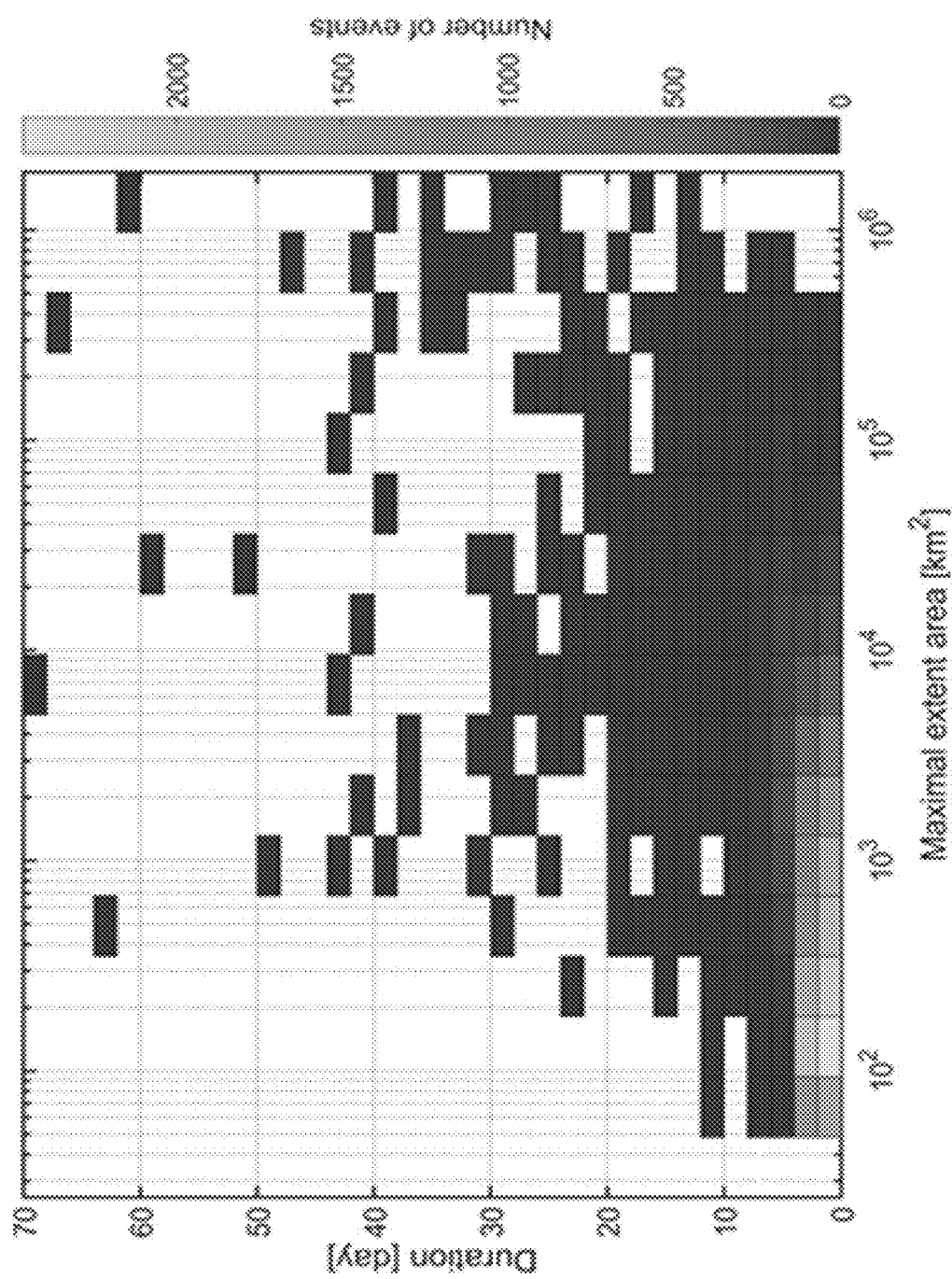
FIG. 9 is a density-colored histogram plot of duration as a function of maximal extent area for all 21,589 events between January 2016 to June 2019.
Figure 10:
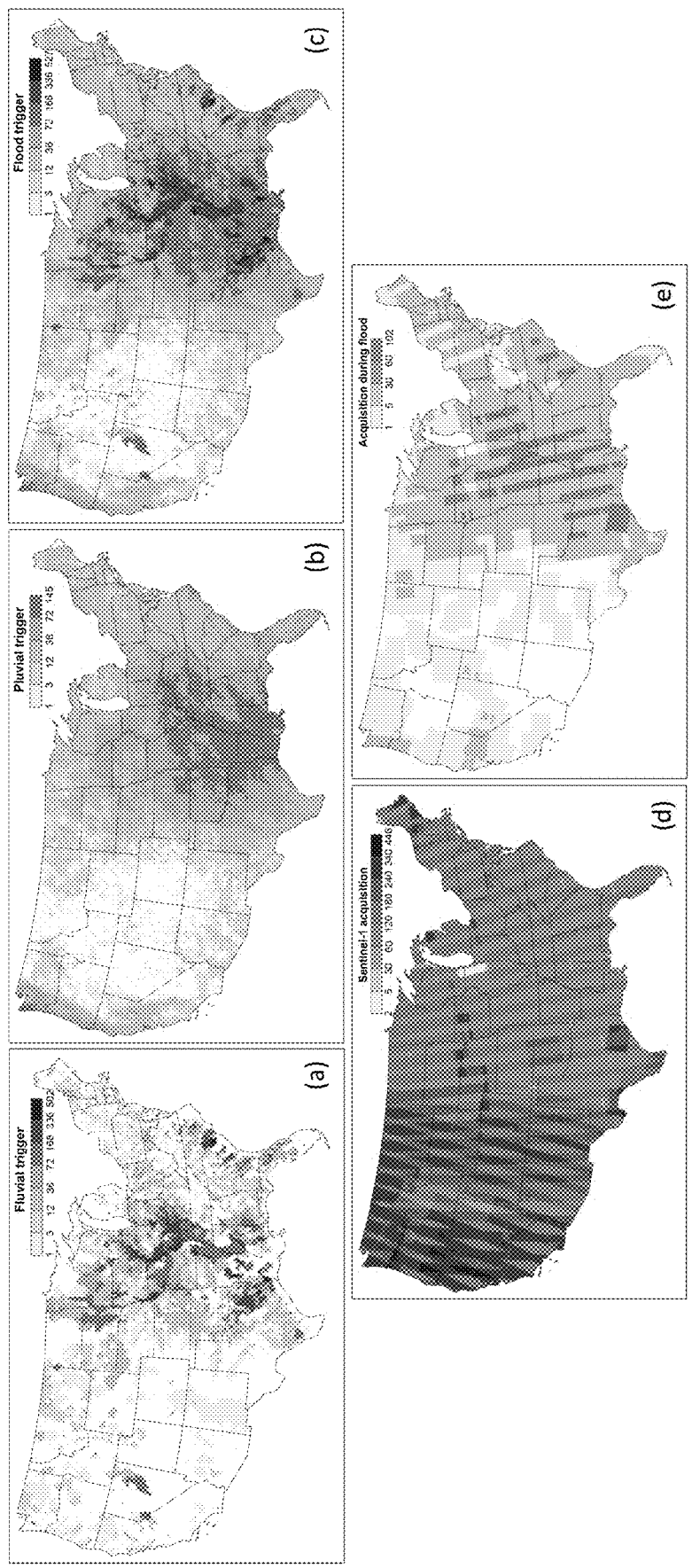
FIG. 10 illustrates an accumulative count of grids (0.1°× 0.1°) during the periods from January 2016 to June 2019 for (a) fluvial trigger based on the USGS stage gaging, (b) pluvial trigger based on the IMERG precipitation, (c) flood trigger by combining (a) & (b), (d) total Sentinel-1 acquisitions and (e) acquisitions in days of flooding.
Figure 11:
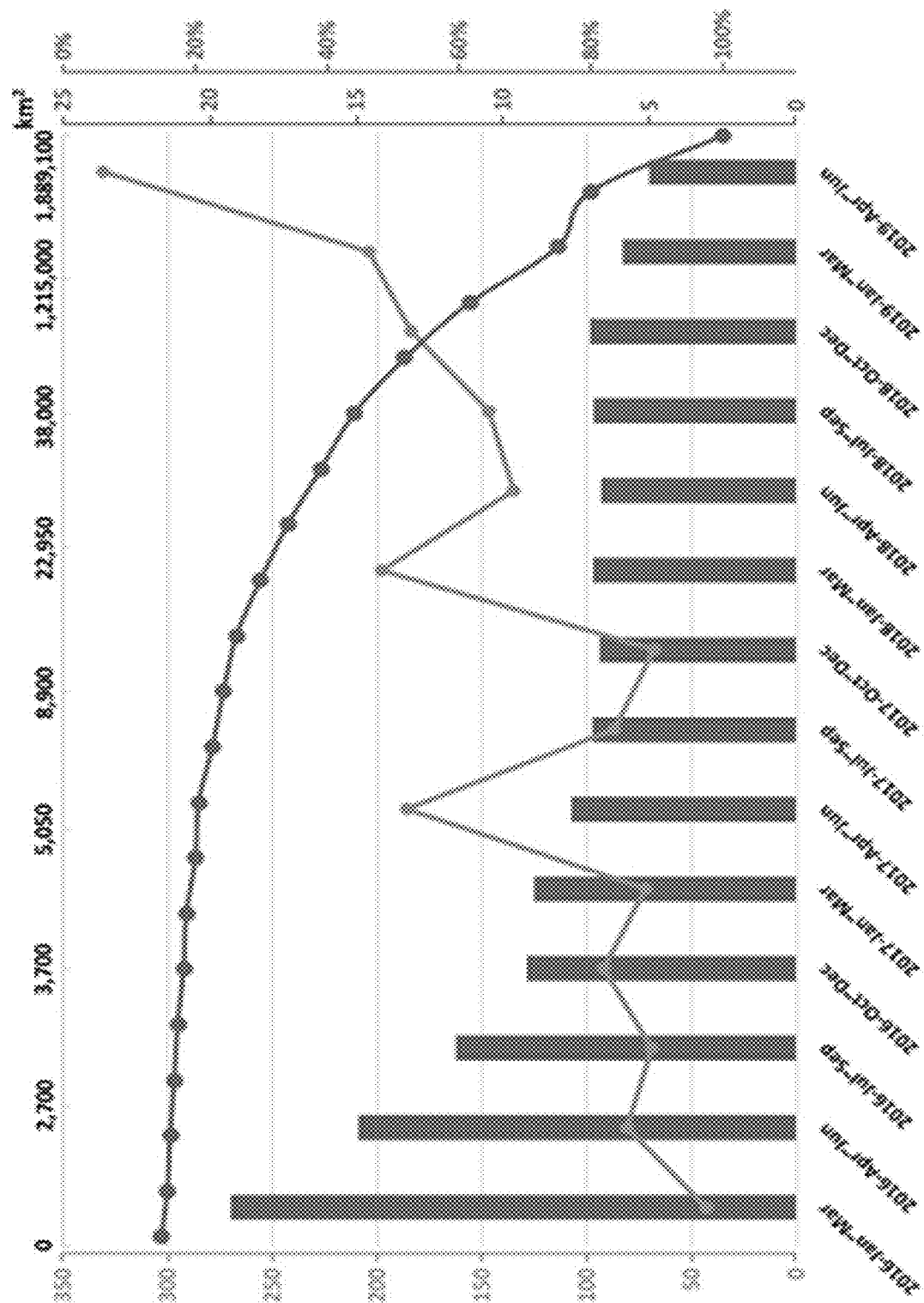
FIG. 11 graphically illustrates the maximal PFZ of an event versus its probability of being covered by Sentinel-1 images (blue line with marks); Average Sentinel-1 acquisition intervals for each 0.1°×0.1° pixel (green columns) and accumulative number of flooding SAR images in every three months (orange line with marks) from January 2016 to June 2019 over CONUS. The abruptly increasing of potential flooded images in 2019 is related to the great Midwestern flood.

By way of example, the RAPID system has detected 21,589 flood events from January 2016 to June 2019, with FIG. 9 showing the distribution of the duration and maximal extent. For these events, the system uses 1,897 SAR images acquired on days of flooding and 8,252 acquired on dry days out of the total 36,860 SAR images overpassing CONUS during the same period. FIGS. 10a and 10b provide the spatial distribution of fluvial and pluvial PFZs and Sentinel-1 acquisitions over CONUS. Significantly more frequent flooding occurred in Central and eastern CONUS, with the highest occurrence in the lower Mississippi River region (FIG. 10c). Although more Sentinel-1 images were acquired in the western than in the eastern CONUS, a smaller portion overlapped with flooding (FIGS. 10d and 10e). Consequently, a total of only 635 triggered flood events were utilized by the RAPID system for inundation map production, with a median duration and maximal triggering extent of 4 days and 8,900 km'. The maximal PFZ of a flood event affects its probability of being captured by Sentinel-1, as plotted in FIG. 11. The archive contains flood events ranging from less than a week (for example, the Massachusetts flood event in March 2018) to several months (such as the so-called Great Flood of 2019 in the Midwest). Events of shorter duration and smaller extent are more likely to be included in the more recent part of the archive because Sentinel-1 increased the average acquisition intervals from 9.6 days (2016-18) to 5.4 days (January to June 2019), as shown in FIG. 11. Additionally, in the presence of major flood events (e.g., Hurricane Harvey in 2017), the maximal revisiting frequency (1-2 days) might be available from the joint use of the Sentinel-1 constellation (S1-A & S1-B) if activated by ESA.

Figure 12:
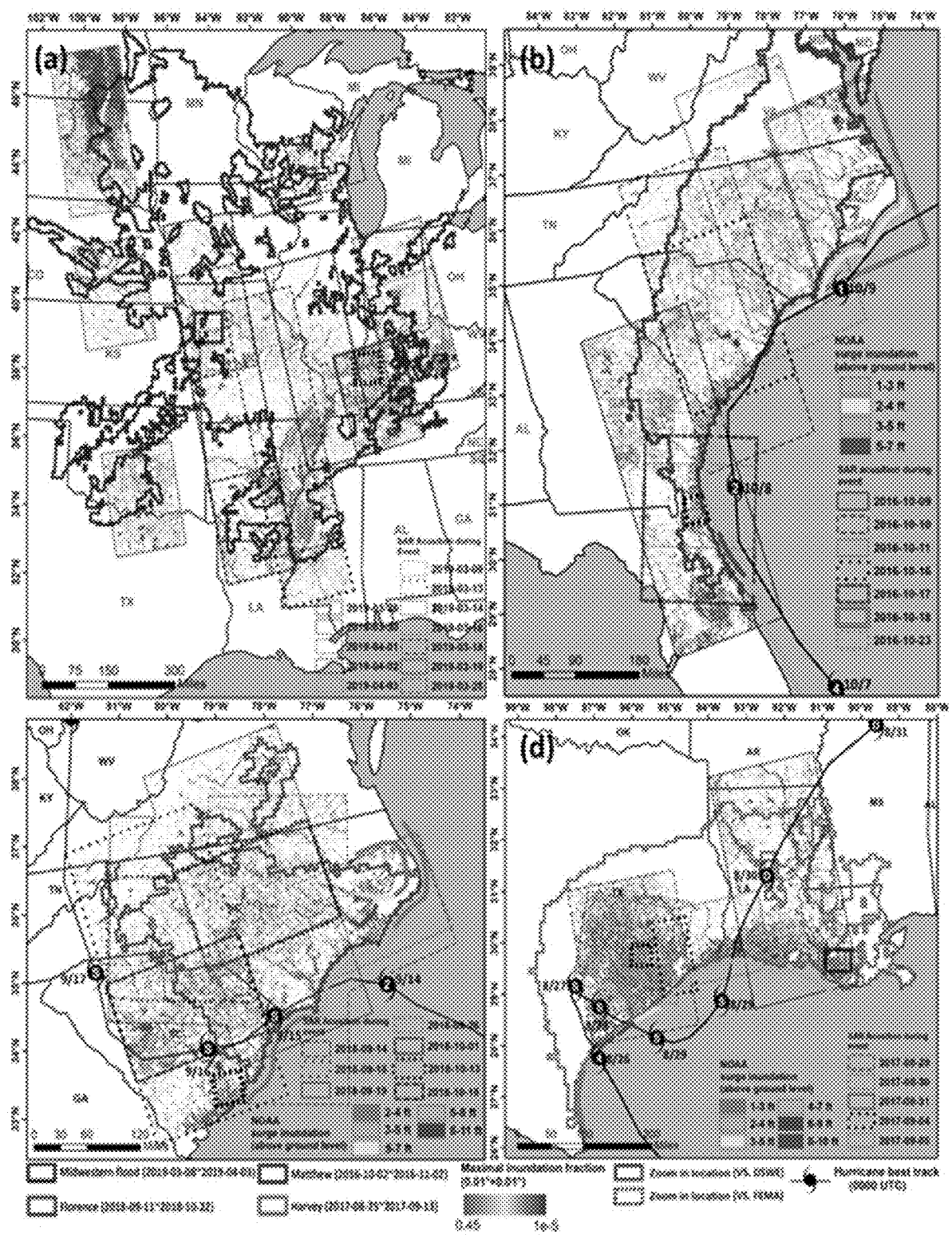
FIG. 12 illustrates four events from the inundation archive at regional scale with locations and duration of the formed events; (a), (b), (c) and (d) being the flood inundation fraction, and the available SAR acquisition during the events of Midwestern flood, hurricane Matthew, Florence and Harvey, respectively. Hurricane best track and surge inundation estimation from NOAA reports were added in (c), (d) and (e) for comparison. Characters inside black circles represent 0000 UTC intensity of hurricanes (D: tropical depression; S: tropical storm; 1-5: hurricane classification based on the Saffir-Simpson scale).

Four well-known and representative flood events—the 2019 Midwestern flood, Hurricane Florence (2018), Hurricane Harvey (2017), and Hurricane Matthew (2016)—were selected as examples to validate event formation and detection of inundation extent (FIG. 12). The maximal PFZ (the solid bold boundaries in FIG. 12) and the event duration for each are consistent with the NOAA or USGS event reports (Stewart 2017, 2019; Blake and Zelinsky 2018; NOAA 2019). It should be noted that, after a storm dissipates, inundation may remain for a while, making the duration of the flood event longer than that of the triggering storm. For visualization, the maximal inundated area is aggregated into $0.01° \times 0.01°$ grids (FIGS. 12a-12d). The inundation fraction of a grid, an indicator of inundation severity, is defined as the inundated area (excluding persistent water bodies) over the total grid area. Moreover, the majority of high fraction locations are distributed along the river (FIG. 12b) and the coast (FIGS. 12c, 12d, and 12e), which agrees with the high stream level (NOAA 2019) and records of storm surge during the events (Stewart 2017, 2019; Blake and Zelinsky 2018), respectively.

Figure 13:
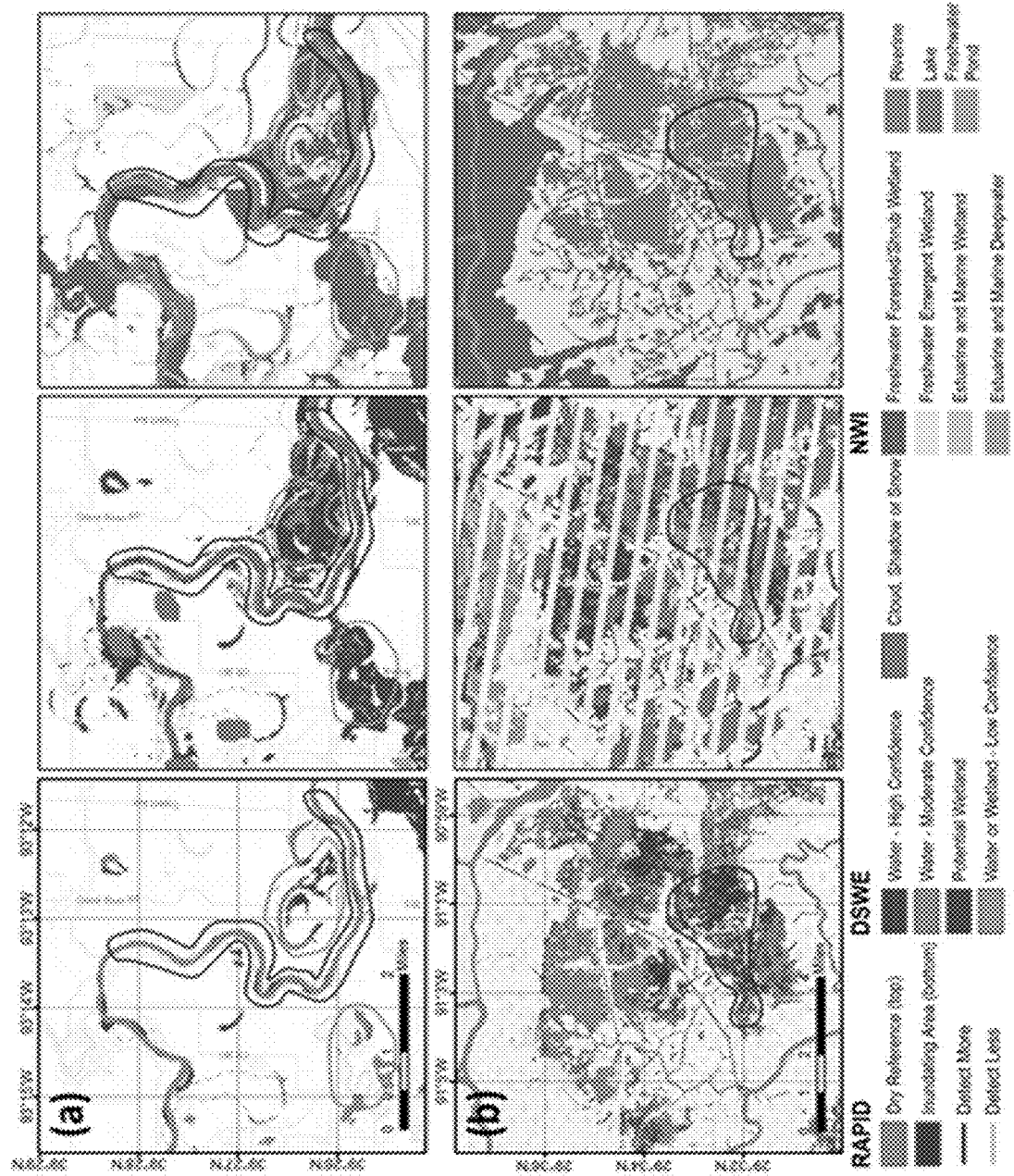
FIG. 13 is an inundation comparison between RAPID (left panels) and DSWE (middle panels), during the event of (a) Midwestern great flood on 2019 March 18 and (b) hurricane Harvey caused flood on 2017 Aug. 31, at the presence of different type of vegetation in right panels [data source: U.S. Fish and Wildlife Service (2020)]. In each panel, the extent of comparison was marked as the zoom in location in FIG. 12.

The visual comparison of the RAPID open water extent with the DSWE product (water with high and moderate confidence) shows strong overall agreement, with some differences in the regions where vegetation is concentrated (FIGS. 13a-13b). For the area covered by woody plants (i.e. forest), the inundation on the ground surface can greatly increase the double-bounce backscattering (Lang et al. 2008; Shen et al. 2019a), featured as strong signals in a SAR image. In this environment, a pixel would be detected as obstructed by RAPID (Shen et al. 2019b), while DSWE may still classify the pixel as water or wetland depending on the open water fraction (Feyisa et al. 2014; Jones 2015), as shown in FIG. 13a. However, for a small river stream across a forest, DSWE tends to misclassify it as partial surface water or even cloud shadow (see FIG. 13a). This might be related to the light absorption effect by the forest canopy layer and the limitation of Landsat's resolution (Huang et al. 2014; Jin et al. 2017; Jones 2019). In the area dominated by herbaceous vegetation (as shown in FIG. 13b), on the other hand, the maps report a larger area with open water pixels since no evident vertical stems exist.

Figure 14:
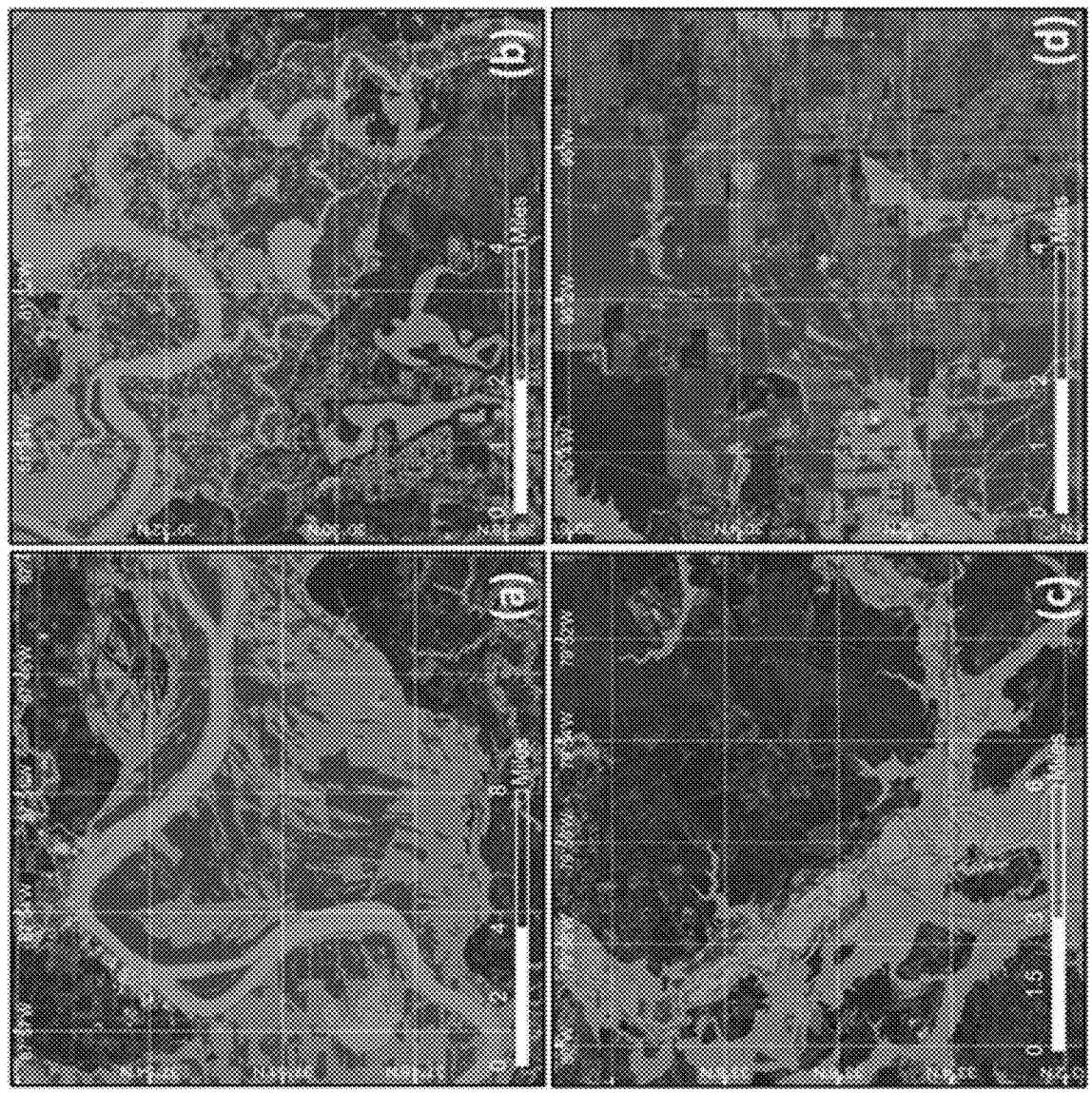
FIG. 14 is an inundation map (blue and red layer) overlap with FEMA-derived flood zone (yellow layer) at the local scale: (a) the Midwestern great flood on 2019 March 14, (b) hurricane Matthew caused flood on 2016 Oct. 11, (c) hurricane Florence caused flood on 2018 Sep. 14, (d) hurricane Harvey caused flood on 2017 Aug. 29. In each panel, the extent of comparison or overlap was marked as the zoom in location in FIG. 12.
Figure 15:
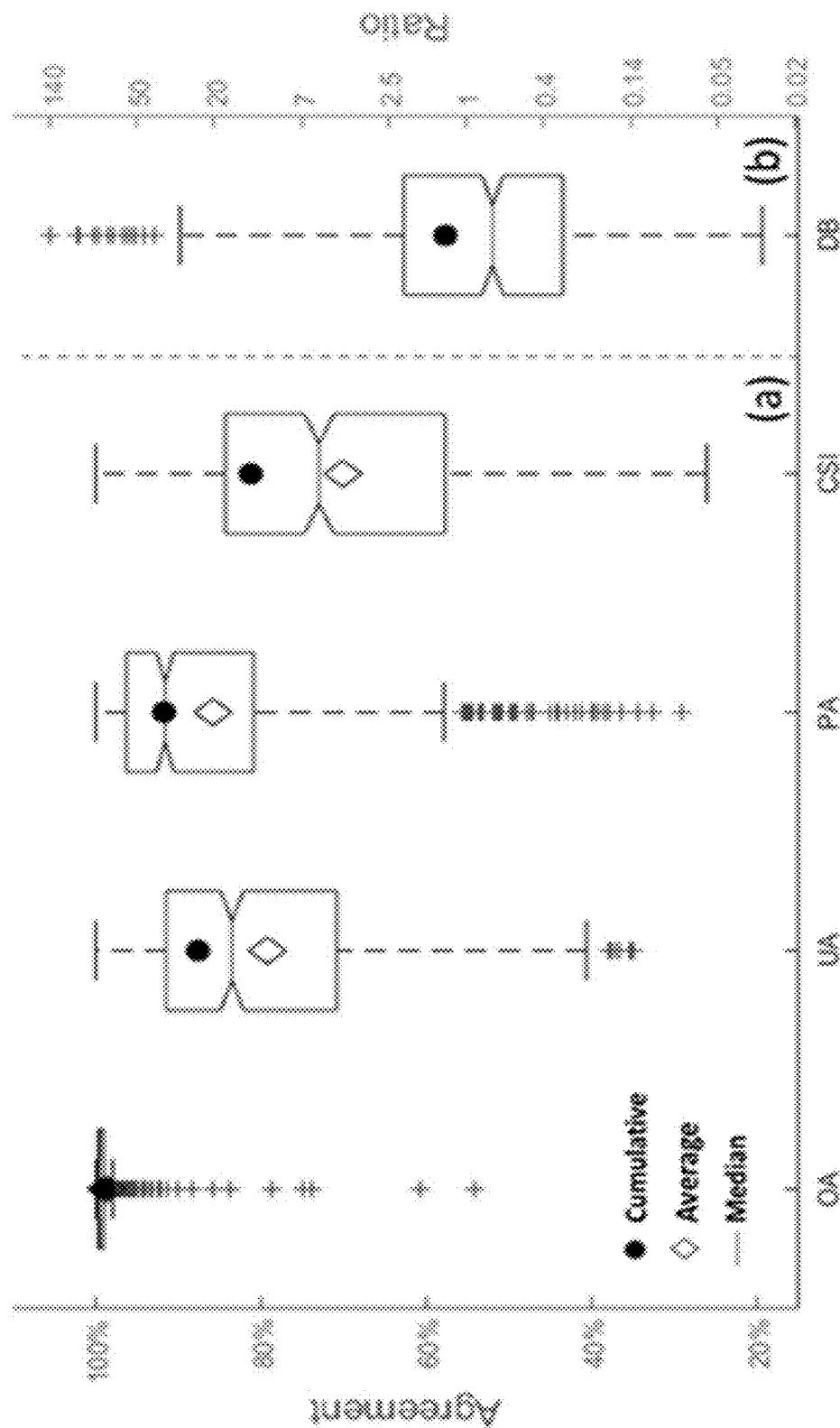
FIG. 15 is a box plot of (a) OA, UA, PA, CSI and (b) DB of 559 images overlapping with DSWE observed from January 2016 to June 2019.
Figure 16:
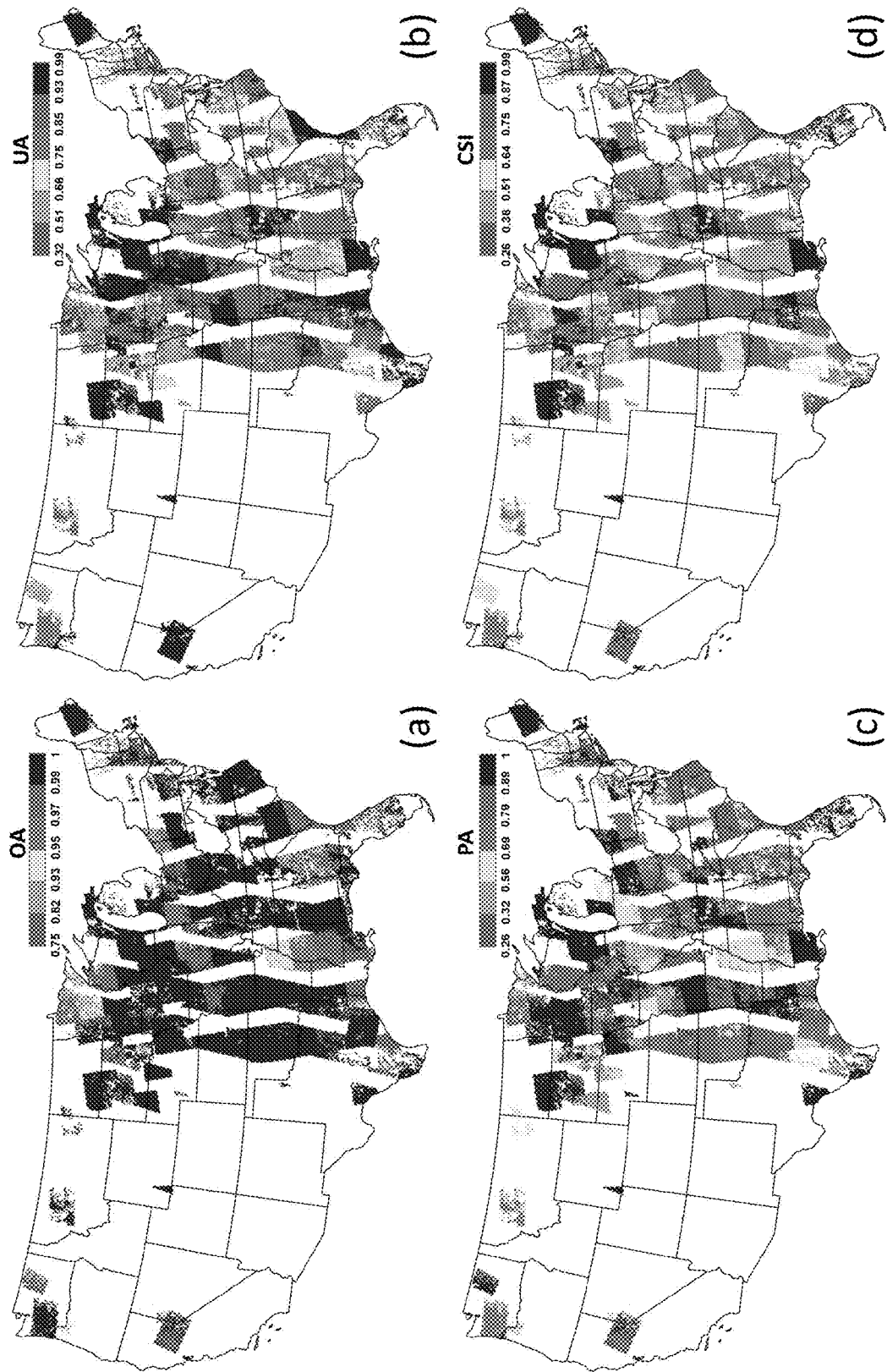
FIG. 16 illustrates a spatial distribution of measures of fit against DSWE.

As well as DSWE, the 100-yr floodplain delineated by FEMA using high-quality local hydraulic/hydrodynamic models (FEMA, 2016), is selected to verify the proposed dataset. As shown in FIGS. 14a-14c, most detected flooding areas are within the FEMA 100-yr floodplain because no flooding were reported greater than 100-yr (Stewart 2017, 2019; NOAA 2019). However, in FIG. 14d, a significant amount of floodwater is found outside of the 100-yr floodplain near the Huston region during Hurricane Harvey, which agrees with the experienced flow that exceeds 100 years return period (Blake and Zelinsky, 2018).

To quantitatively evaluate the overall accuracy of the inundation archive, we compare the overlapping areas pixel by pixel using DSWE as reference. Here, the "overlapping area" refers to the common pixels covered by both DSWE and the proposed dataset on the same day. We exclude any pixels identified as cloud, cloud shadow, shaded relief, missing pixels by the scanline corrector, and other types of error recorded by the DSWE mask band in the "overlapping area". We resample the DSWE pixel to the resolution of Sentinel-1, 10 m×10 m. Additionally, we also exclude pixels labeled in DSWE as potential wetland or water (wetland) with low confidence (Zanter 2019) for the comparison. We use five error metrics in the assessment: overall agreement (OA), user agreement (UA), producer agreement (PA), critical success index (CSI), and detection bias (DB):

$$OA = \frac{TP + TN}{TP + FP + FN + TN}, \quad (16)$$

$$UA = \frac{TP}{TP + FP}, \quad (17)$$

$$PA = \frac{TP}{TP + FN}, \quad (18)$$

$$CSI = \frac{TP}{TP + FP + FN}, \quad (19)$$

$$DB = \frac{FP}{FN}. \quad (20)$$

Where TP, TN, FP and FN stand for the true-positive, true-negative, false-positive, and false-negative, respectively, and positive (negative) represent the wet (dry) pixels. Analyzing over 73 billion pixels, the two datasets agree well across all 559 overlapping images, with the OA, UA, PA, CSI, and DB at 99.06%, 87.63%, 91.76%, 81.23%, and 1.27, respectively (FIGS. 8a-8b). The high value of PA indicates that over 90% of the DSWE open water area is captured by our archive. Meanwhile, represented by UA, only less than 15% of water pixels are "false alarms". An overall tendency towards more-detection is reported by DB over CONUS area, while the OA and CSI still confirm the consistency. FIGS. 16a-16d provide the spatial distribution of the temporally averaged OA, UA, PA, and CSI (upscaled to 0.1°× 0.1° grids for visualization). Moreover, relative low agreements could be found on the upper Missouri, lower Mississippi, south-east coastal and new England (FIGS. 16b and 16d), regions with high wetland density (Cohen et al. 2016). It is evident that the presence of vegetation greatly affects the agreement between the two datasets.

Figure 17:
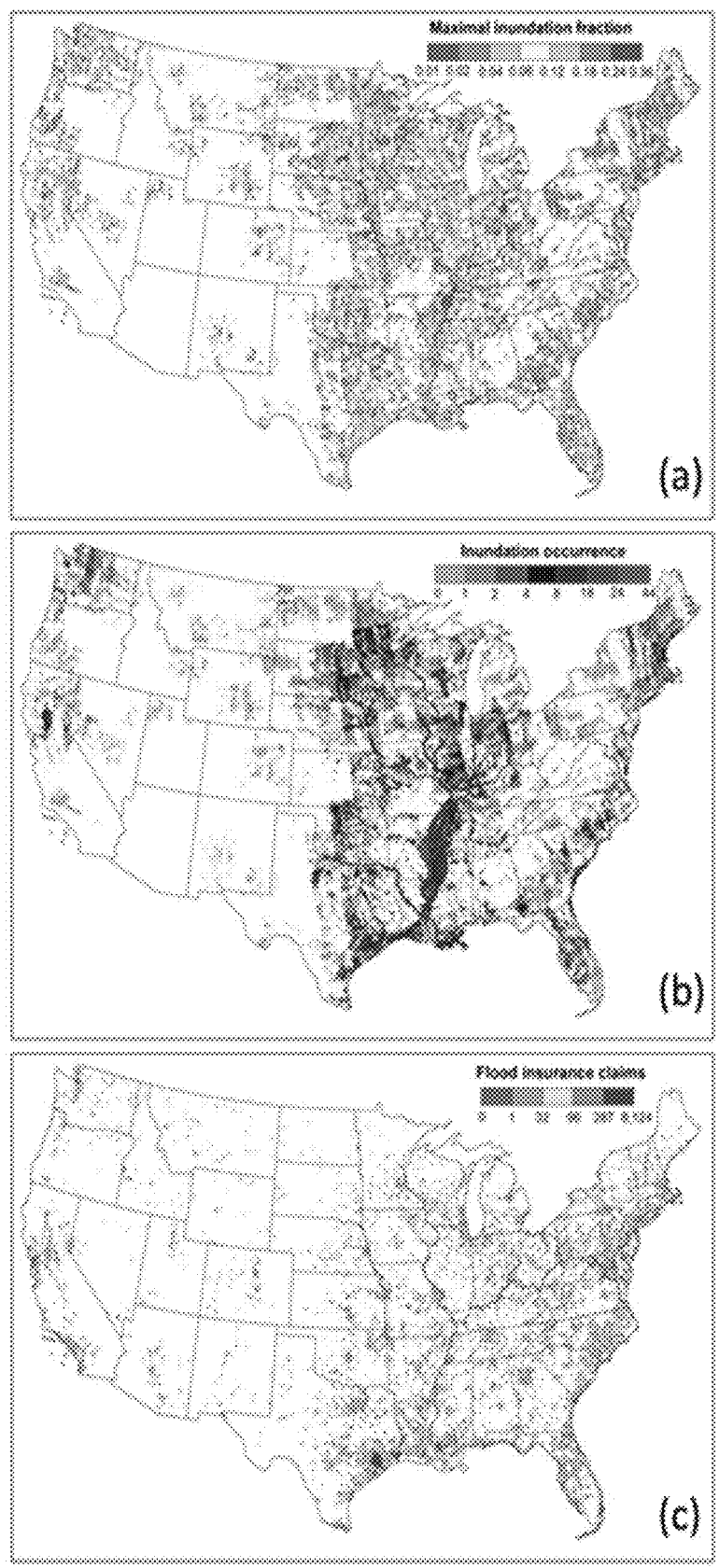
FIG. 17 illustrates (a) Area-fraction of maximal inundation (exclude persistent water bodies) over 0.1°×0.1° cells from January 2016 to June 2019; (b) total number of observed flooded days for each cell; (c) number of flood insurance claims from National Flood Insurance Program

FIGS. 17a and 17b show the maximal inundation fraction and occurrence (the number of inundated days) computed from the proposed archive at the national scale. For visualization, we upscaled the 10 m×10 m binary result to 0.1°× 0.1°. The final inundation occurrence and fraction delineated from SAR images show consistent spatial patterns to the potential flooded areas extracted from observed streamflow and precipitation (FIG. 10c), indicating that the dataset well captured the overall CONUS inundation pattern. Regions with high fraction are concentrated in the Midwestern and the riverine area of the lower Mississippi. This finding also agrees with a conclusion drawn from the long-term Landsat-based water occurrence dataset (Chouinard et al. 2015; Aires et al. 2018)—that is, transitory water areas are dominated by high water occurrence, resulting in higher flood vulnerability. Additionally, our archive shows that the areas along the Gulf Coast and the Atlantic Coast have higher inundation occurrences, most likely caused by the landfall of hurricanes. By comparing FIG. 17c to FIGS. 17a and 17b, we observe that areas with more severe inundation caused by hurricanes generally report more flood insurance claims than regions flooded by the transitory water bodies, which indicates that householders tend to have fewer properties built in vulnerable flood zones created by large inland rivers than in vulnerable flood zones along the coast. This finding also agrees with Kousky and Michel-Kerjan (2017). Weak correlation between the inundation severity and claim are found in coastal regions in North Carolina, Pennsylvania, and Southern California, where light to moderate inundation fraction can sometimes overlap with high claim numbers. One possible explanation is the relatively low SAR acquisition in these areas, which only covers 45.72% of the total 287,439 claims reported from 2016 to 2019 (FEMA 2019). Direct evaluation of property damage in the building-level based on our archive is not recommended, even for the event with decent SAR coverage, since the RAPID algorithm only works for non-obstructed inundation (Shen et al. 2019b). Therefore, a user must utilize our dataset for inundation estimation in urban areas with a certain degree of caution.

What is claimed is:

1. A system to generate a flood inundation map, the system comprising:
    a flood trigger system configured to identify a flood occurring zone having one or more bodies of water;
    a SAR data query system to identify relevant satellite images for the flood occurring zones; and
    a kernel algorithm system including an electronic processor configured to
        receive the data from the flood trigger system,
        receive the satellite images from the SAR data query system,
        generate a binary classification of water and non-water at pixel level of the satellite images,
        morphologically process the satellite images to reduce over-detection of the bodies of water and to reduce under-detection of the bodies of water,
        apply a multi-threshold compensation to reduce speckle noise in the bodies of water,
        apply machine learning-based correction for speckle, and
        generate a flood inundation map.

2. The system of claim 1 wherein the flood inundation map is generated in near real time.

3. The system of claim 1 wherein the electronic processor is further configured to apply a probability density threshold to identify the pixels in the satellite images correspond to water or non-water.

4. The system of claim 1 wherein the electronic processor is further configured to generate a plurality of water masks from a single satellite image, and wherein each mask uses a different probability density threshold to reduce the over-detection and the under-detection of the bodies of water.

5. The system of claim 1 wherein morphologically processing the satellite images includes water source tracing and improved change detection.

6. The system of claim 5 wherein water source training includes applying a region-growing algorithm to identify water bodies from known water sources.

7. The system of claim 5 wherein improved change detection includes applying a region-growing algorithm over the non-water pixels to identify water bodies.

8. The system of claim 1 wherein the electronic processor is further configured to apply a correction algorithm to the satellite images to identify whether a pixel is within a standing water body or a water body in movement.

9. The system of claim 1 wherein the flood trigger system is configured to detect fluvial flooding and pluvial flooding.

10. The system of claim 1 wherein when the flood trigger system identifies a flood occurring zone, the SAR data query system retrieves satellite images of the flood zone on the day of flooding and a plurality of satellite images prior to the flooding.

11. A method of generating a flood inundation map in near real time, the method comprising:
 identifying, with an electronic processor, a flood event;
 retrieving, with an electronic processor, a plurality of satellite images of an area defined by the flood event; and
 receiving, by a kernel algorithm system, the satellite images, the kernel algorithm system configured to
  apply a water identifier or a non-water identifier for each of the pixels in the satellite images,
  morphologically process the satellite images to reduce over-detection of the bodies of water and to reduce under-detection of the bodies of water,
  apply a multi-threshold compensation to reduce speckle noise in the bodies of water,
  apply machine learning-based correction for speckle, and
  generate a flood inundation map.

12. The system of claim 11 further comprising applying a probability density threshold to identify the pixels in the satellite images that correspond to water or non-water.

13. The system of claim 11 further comprising generating a plurality of water masks from a single satellite image, and wherein each mask uses a different probability density threshold to reduce the over-detection and the under-detection of the bodies of water.

14. The system of claim 11 wherein morphologically processing the satellite images includes water source tracing and improved change detection.

15. The system of claim 14 wherein water source training includes applying a region-growing algorithm to identify water bodies from known water sources.

16. The system of claim 14 wherein improved change detection includes applying a region-growing algorithm over the non-water pixels to identify water bodies.

17. The system of claim 11 further comprising applying a correction algorithm to the satellite images to identify whether a pixel is within a standing water body or a water body in movement.

18. The system of claim 11 further comprising detecting fluvial flooding and pluvial flooding.

* * * * *